United States Patent [19]

Ackerman et al.

[11] Patent Number: 4,692,913

[45] Date of Patent: * Sep. 8, 1987

[54] METHOD AND APPARATUS FOR READING A DATA RECORD CARRIER

[75] Inventors: Richard Ackerman, Fremont, Calif.; Donovan W. Hurlbut, Whitewater; Alan A. Jewer, Ft. Atkinson, both of Wis.

[73] Assignee: News Log International, Inc., Janesville, Wis.

[*] Notice: The portion of the term of this patent subsequent to Nov. 15, 2000 has been disclaimed.

[21] Appl. No.: 551,638

[22] Filed: Nov. 14, 1983

Related U.S. Application Data

[63] Continuation-in-part of Ser. No. 210,847, Nov. 26, 1980, Pat. No. 4,416,001.

[51] Int. Cl.$^4$ ............................................. G11B 7/09
[52] U.S. Cl. ................................... 369/44; 369/111; 369/100; 250/202; 250/236
[58] Field of Search .................. 369/30, 32, 33, 44, 369/45, 59, 50, 54, 58, 111, 100; 365/120, 127; 250/202, 234, 235, 236; 371/2, 38

[56] References Cited

U.S. PATENT DOCUMENTS

| | | | |
|---|---|---|---|
| 3,137,768 | 6/1964 | Mullin | 178/6.6 |
| 3,177,476 | 4/1965 | Robinson | 340/174.1 |
| 3,186,707 | 6/1965 | Banning, Jr. et al. | 274/41.4 |
| 3,198,527 | 8/1965 | Stanton | 274/11 |
| 3,387,295 | 6/1968 | DeMoss | 340/147.1 |
| 3,501,586 | 3/1970 | Russell | 178/6.7 |
| 3,543,007 | 11/1970 | Brinker | 235/436 |
| 3,549,826 | 12/1970 | Browning | 179/100.3 |
| 3,549,897 | 12/1970 | Blake | 250/231 |
| 3,564,120 | 2/1971 | Taylor | 358/296 |
| 3,624,284 | 11/1971 | Russell | 178/6.7 A |
| 3,675,930 | 7/1972 | Summerfield | 369/63 |
| 3,765,743 | 10/1973 | Reaves et al. | 350/7 |
| 3,795,902 | 3/1974 | Russell | 340/173 LM |
| 3,806,643 | 4/1974 | Russell | 178/6.7 R |
| 3,885,094 | 5/1975 | Russell | 178/7.6 |
| 3,891,794 | 6/1975 | Russell | 178/6.7 R |
| 3,898,629 | 8/1975 | Westerberg | 365/127 |
| 3,919,697 | 11/1975 | Walker | 340/173 R |
| 3,939,302 | 2/1976 | Kihara | 369/112 |
| 3,961,315 | 6/1976 | Yokoyama | 340/173 LM |
| 3,963,863 | 6/1976 | Molissin | 369/44 |
| 3,983,317 | 9/1976 | Glorioso | 178/6.6 R |
| 4,090,031 | 5/1978 | Russell | 358/130 |
| 4,094,010 | 6/1978 | Pepperl et al. | 365/215 |
| 4,094,013 | 6/1978 | Hill et al. | 365/234 |
| 4,102,569 | 7/1978 | Schwartz | 353/120 |
| 4,157,577 | 6/1979 | Porter, Jr. et al. | 360/77 |
| 4,163,600 | 8/1979 | Russell | 369/44 |
| 4,209,804 | 6/1980 | Dil | 358/128.5 |
| 4,213,040 | 7/1980 | Gokey et al. | 235/476 |
| 4,224,481 | 9/1980 | Russell | 179/100.3 B |
| 4,254,329 | 3/1981 | Gokey | 235/379 |
| 4,353,077 | 10/1982 | Gokey et al. | 346/137 |
| 4,375,100 | 2/1983 | Tsuji | 371/38 |
| 4,410,877 | 10/1983 | Carasso et al. | 340/347 DD |
| 4,416,001 | 11/1983 | Ackerman | 369/44 |
| 4,441,184 | 4/1984 | Sonoda | 371/40 |
| 4,519,054 | 5/1985 | Jewer | 369/32 |
| 4,534,031 | 8/1985 | Jewer | 369/93 |

*Primary Examiner*—Alan Faber
*Attorney, Agent, or Firm*—Thomas R. Vigil

[57] ABSTRACT

The method of reading data from a data record carrier on which data has been recorded in arcuately nested, equal radii data rows which are equally spaced apart along a common centerline that is coextensive with a radius for each data row, comprises the steps of: incrementally moving the data record carrier in steps transversely of the data rows; projecting a light beam onto the plane in which the data record carrier moves; rotating the light beam about an axis parallel to the axis of said light beam to rotate said light beam in an arcuate path across the data record carrier, the radius of the arcuate path being the same or approximately the same radius of each data row; detecting scattered light outside the cone of specular reflection from the light beam impinging on the data record carrier, or the lack of scattered light, as the light beam traverses each data row; and sensing, and correcting for, difference between the arcuate path of said light beam and the arcuate path of the data row being traversed by said light beam to ensure that said light beam traverses approximately the same arc as that of each data row.

29 Claims, 21 Drawing Figures

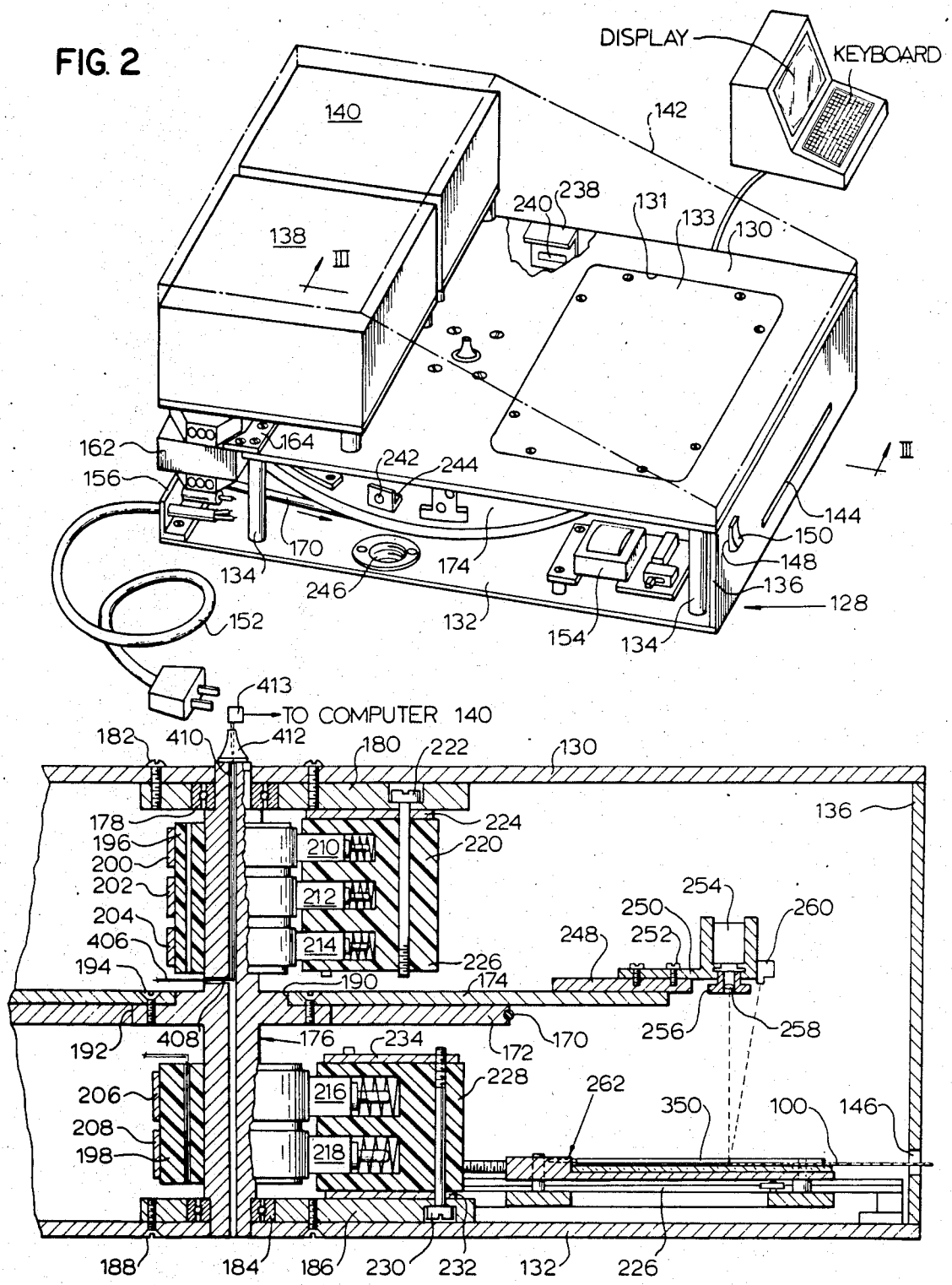

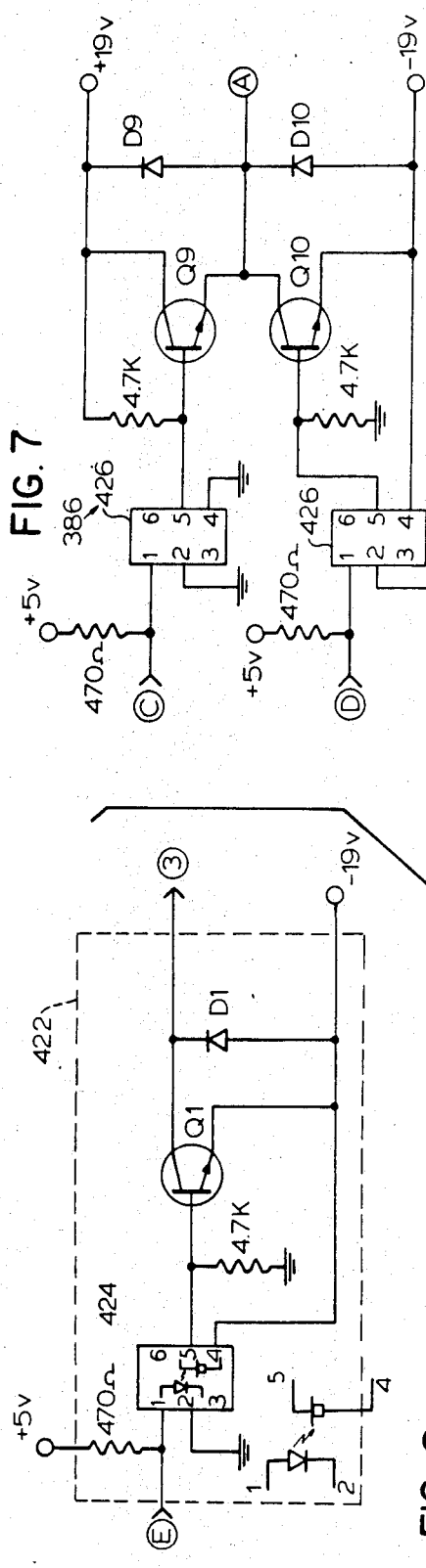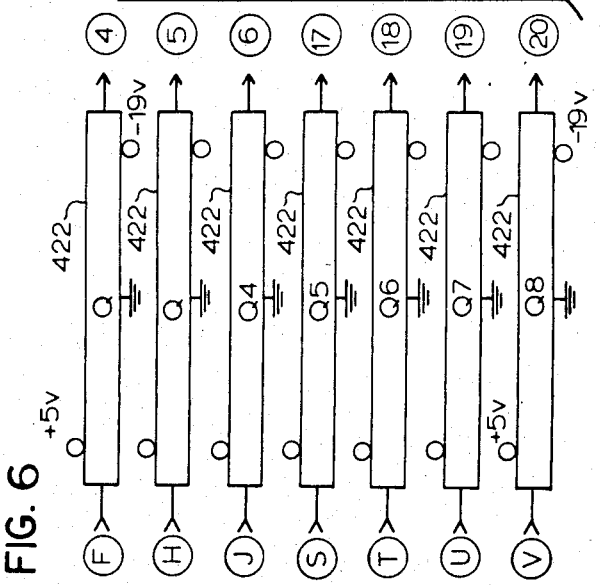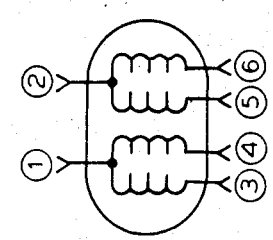

METHOD AND APPARATUS FOR READING A DATA RECORD CARRIER

CROSS REFERENCE TO RELATED APPLICATIONS

This application is a continuation-in-part of U.S. application Ser. No. 210,847 filed on Nov. 26, 1980 for: METHOD AND APPARATUS FOR OPTICALLY READING DIGITAL DATA INSCRIBED IN AN ARCUATE PATTERN ON A DATA CARRIER now issued to U.S. Pat. No. 4,416,001 on Nov. 15, 1983. Also, this application is related to application Ser. No. 445,241 filed Nov. 29, 1982 for: CODED DATA ON A RECORD CARRIER AND METHOD FOR ENCODING SAME, now U.S. Pat. No. 4,534,031, which is a continuation-in-part of U.S. application Ser. No. 404,507 filed on Aug. 2, 1982 and entitled: METHOD FOR FORMATTING OPTICALLY ENCODED DIGITAL DATA ON A SUBSTRATE AND THE DATA RECORD CARRIER FORMED THEREBY which is a continuation-in-part of U.S. application Ser. No. 384,582 filed on June 2, 1982 and entitled: METHOD FOR OPTICALLY ENCODING DIGITAL DATA ON A SUBSTRATE AND THE DATA RECORD CARRIER FORMED THEREBY, all of which are related to U.S. application Ser. No. 290,475 filed on Aug. 6, 1981 and entitled: A DIGITAL DATA RECORD, now abandoned, and Ser. No. 625,573, filed June 28, 1984, now U.S. Pat. No. 4,571,713, a continuation of Ser. No. 290,475.

TECHNICAL FIELD

The present invention relates to a method and apparatus for optically reading digital data information from a data record carrier on which the data is inscribed in arcuate tracks on the data record carrier. More particularly, the invention relates to the retrieval of digital data information from a data record carrier on which the digital data information is stored on a carrier body in spaced-apart arcuately nested rows, the group of rows extending in an arcuate manner across the carrier body.

BACKGROUND ART

Heretofore a number of systems have been proposed for reading data, such as digital data information on a data record carrier. Examples of some of the previously proposed systems are disclosed in the following U.S. Patents:

| U.S. PAT. NO. | PATENTEE |
|---|---|
| 4,213,040 | Gokey et al |
| 4,254,329 | Gokey et al |
| 4,353,077 | Gokey et al |
| 3,549,897 | Blake |
| 3,501,586 | Russell |
| 3,624,284 | Russell |
| 3,795,902 | Russell |
| 3,806,643 | Russell |
| 3,885,094 | Russell |
| 3,891,794 | Russell |
| 4,090,031 | Russell |
| 4,163,600 | Russell |
| 4,224,481 | Russell |
| 3,137,768 | Mullin |
| 3,177,476 | Robinson |
| 3,387,295 | DeMoss |
| 3,564,120 | Taylor |
| 3,765,743 | Reaves et al |
| 3,898,629 | Westerberg |
| 3,919,697 | Walker |
| 3,983,317 | Glorioso |
| 3,963,863 | Malissin et al |
| 4,094,010 | Pepperl et al |
| 4,094,013 | Hill et al |
| 4,209,804 | Dil |

The Gokey et al U.S. Pat. No. 4,213,040 and the Gokey et al U.S. Pat. No. 4,254,329 disclose the provision of digital information in rows and columns on a data carrier, in which access and reading is performed with an X-Y transport adapted for skew correction.

The Gokey et al U.S. Pat. No. 4,353,077 discloses an information record which takes the form of a disc in which the rows of information are disposed as straight radial lines, arcuate radial lines or circles with respect to the axis of rotation of the disc.

The Blake U.S. Pat. No. 3,549,897 discloses an absolute electro-optical encoder for indicating the angular position of a shaft. The encoder includes a stationary disc and a rotary disc, the discs having concentric tracks with transmissive and non-transmissive portions which are binarily related. Light passing through the discs is picked up by certain selected combinations of photocells for indicating the position of one disc relative to the other disc.

In the Russell U.S. Pat. Nos. 3,501,586; 3,624,284; 3,795,902; 3,885,094; 3,806,643; 3,891,794; 4,090,031; 4,163,600 and 4,224,481, various "writers" and "readers" are disclosed for "writing" digital data on a spiral track and for "reading" digital data from the spiral track. In the optical encoding and decoding systems described in these patents opaque spots on the track correspond to logic 1 bits of binary data and transparent spots on the track correspond to logic 0 bits of binary data. Also, larger synchronization spots are provided at different places along the track.

The Mullin U.S. Pat. No. 3,137,768 discloses a system for skew correction in a recording and reproduction system. Where skew correction for a film strip having data recorded thereon is achieved by an adjustable deflection arrangement for adjusting the direction of scanning each line in the transverse direction of the film strip.

The Robinson U.S. Pat. No. 3,177,476 discloses an information storage apparatus utilizing a record of internally reflective light conducting material. Here again, data is recorded on spiral record tracks on the recording surface of a disc record.

The DeMoss U.S. Pat. No. 3,387,295 discloses a tape transport system with skew correction. Here a torsionally deformable capstan is controlled by signals representing tape skew of a strip of tape.

The Taylor U.S. Pat. No. 3,564,120 discloses an image construction system with arcuately scanning drop generators. Here an optical scanning system is provided for scanning arcuate lines 21 on a web 82.

The Reaves et al U.S. Pat. No. 3,765,743 discloses an optical energy detection system including an image plane scanning system. Here a scanning wheel is provided for coupling optical energy from a lens to a detector.

An apparatus for scanning a data record medium is disclosed in the Westerberg U.S. Pat. No. 3,898,629 wherein binary digital information is recorded in the form of data along a circular arc and a plurality of such circle arcs of data information are arranged tightly adjacent each other. Here light is directed from a stationary location through a hollow shaft to prisms rotatable on a turntable for directing light down onto a record carrier.

In the Walker U.S. Pat. No. 3,919,697 there is disclosed a data record having track lines which may be separate parallel tracks or may be a single series track of the spiral or raster type.

In the Glorioso U.S. Pat. No. 3,983,317 there is disclosed an astigmatizer for a laser recording and reproducing system. In this system concentric circular tracks are formed in a thermoplastic record or disc by burning selected holes through the disc with a laser. The laser is "on" while the disc is being rotated a short distance to form an elongate data information bit in the track. Then, in reading the data the laser beam or spot is elongated in a direction transverse to the direction of the track with an astigmatizer unit so that a small elongate beam of light with an axis extending transverse to the axis of the track and of the elongate opening therein is used to read the opening.

The Malissin et al U.S. Pat. No. 3,963,863 discloses a device for reading out information recorded upon a substrate. Here a vertically arranged fixed pickup head is positioned about a rotatable carrier with a movable axis of rotation.

In the Pepperl et al U.S. Pat. No. 4,094,010 there is disclosed an optical multi-channel digital disc storage system. Data is stored on a spiral information track and holes corresponding to the information data are burned into the material of the disc by an information radiation beam.

The Hill et al U.S. Pat. No. 4,094,013 discloses an optical storage disc system with disc track guide sectors wherein the data tracks are spiral shaped turns or concentric turns on the disc. The data stored is again in the form of holes burned into the disc.

The Dil U.S. Pat. No. 4,209,804 discloses a record carrier containing information in an optically readable radiation reflecting information structure. With the record carrier of this patent, data is stored in a spiral track on a disc in the form of information areas comprising pits pressed into the record carrier surface or hills projecting from the record carrier surface. According to the teachings of this patent, the depth of the pits or the height of the hills is constant and so is the width of the information areas and intermediate areas at the level of the plane of the lands. Then the information to be conveyed by the record carrier is contained in the variation of the structure of the areas in the tangential direction only. More specifically, the information areas are substantially V-shaped, the phase depth of each information area having one value between 100° and 120° and the angle of inclination between the walls of the information areas and normal to the record carrier are substantially constant and have a value between 65° and 85°.

As will be described in greater detail hereinafter the method and apparatus of the present invention differs from the previously proposed methods and appratus by providing steps of or means for sensing a difrerence in an arcuate light beam path and an arcuate row of data on a data record carrier and for correcting the difference which may be a skew correction to place a radius and centerline of the data row into alighment with a radius of the arcuate light beam path on which may be a radius adjustment of the radius of the light beam from its axis of rotation to be substantially the same as the radius of each arcuate data row.

The apparatus also provides electrical-optical transmission means for transmitting optically detected data electrically, optically and then electrically from a turntable to a stationary coupler coupled to a computer. Further the appratus provides a transformer between the turntable and a fixed member for transferring electric power across an air gap to the rotatable turntable.

DISCLOSURE OF INVENTION

According to the invention there is provided a method for optically reading data from a data record carrier which has data inscribed thereon in a plurality of equal radii arcuate rows of data which are arranged along a common line in a nested array and which is carried on a planar table, comprising the steps of: rotating the table about the axis of rotation of the arcuate data rows and in a plane which is coplanar with its own plane; projecting a laser beam substantially perpendicular to the plane of rotation to strike the data record carrier in such a way as to establish a scanning arc corresponding to the arc of each data row; detecting reflected or transmitted light or non-reflected or non-transmitted light from each data cell in one data row and incrementally moving the scanning arc in steps of at least the spacing from one data row to the adjacent data row along said common line after a data row has been scanned.

Further, according to the invention there is provided a method of reading data from a data record carrier on which data has been recorded in arcuately nested, equal radii data rows which are equally spaced apart along a common centerline that is coextensive with a radius for each data row, comprising the steps of: incrementally moving the data record carrier in steps transversely of the data rows; projecting a light beam onto the plane in which the data record carrier moves; rotating the light beam about an axis parallel to the axis of said light beam to rotate said light beam in an arcuate path across the data record carrier, the radius of the arcuate path being the same or approximately the same radius of each data row; detecting scattered light outside the cone of specular reflection from the light beam impinging on the data record carrier, or the lack of scattered light, as the light beam traverses each data row; and sensing, and correcting for, difference between the arcuate path of said light beam and the arcuate path of the data row being traversed by said light beam to ensure that said light beam traverses approximately the same arc as that of each data row.

Still further according to the invention there is provided an apparatus for reading data from a data record carrier on which data has been recorded in arcuately nested, equal radii data rows which are equally spaced apart along a common centerline that is coextensive with a radius for each data row, comprising: means for incrementally moving the data record carrier in steps transversely of the data rows; means for projecting a light beam onto the plane in which the data record carrier moves; means for rotating said light beam about an axis parallel to the axis of said light beam to rotate said light beam in an arcuate path across the data record carrier, the radius of the arcuate path being the same or approximately the same radius of each data row; means for detecting scattered light outside the cone of specular reflection from the light beam impinging on the data record carrier, or the lack of scattered light, as the light beam traverses each data row; means for sensing difference between the arcuate path of said light beam and the arcuate path of the data row being traversed by said light beam, and means for correcting the difference to ensure that said light beam traverses approximately the same arc as that of each data row.

BRIEF DESCRIPTION OF DRAWINGS

FIG. 2 is a perspective view of one embodiment of an apparatus constructed according to the teachings of the present invention with an outer cover omitted, but shown in phantom;

FIG. 3 is a fragmentary vertical sectional view of the apparatus shown in FIG. 1 and is taken along line III—III of FIG. 2;

FIG. 6 is a schematic circuit diagram of motor control circuits for controlling operation of the skew motor and the carriage structure incrementing motor;

FIG. 7 is a schematic circuit diagram of a motor control circuit for controlling the operation of the radius motor;

FIGS. 8 and 9 are schematic circuit diagrams of the windings of the carriage structure incrementing motor and of the skew motor;

FIG. 10 is a table of circuit board connector pin interconnections for connecting the control circuits shown in FIG. 6 with the motor circuits shown in FIGS. 8 and 9 and the control inputs effective to cause operation of these motors;

BEST MODES FOR CARRYING OUT THE INVENTION

Figure 1:
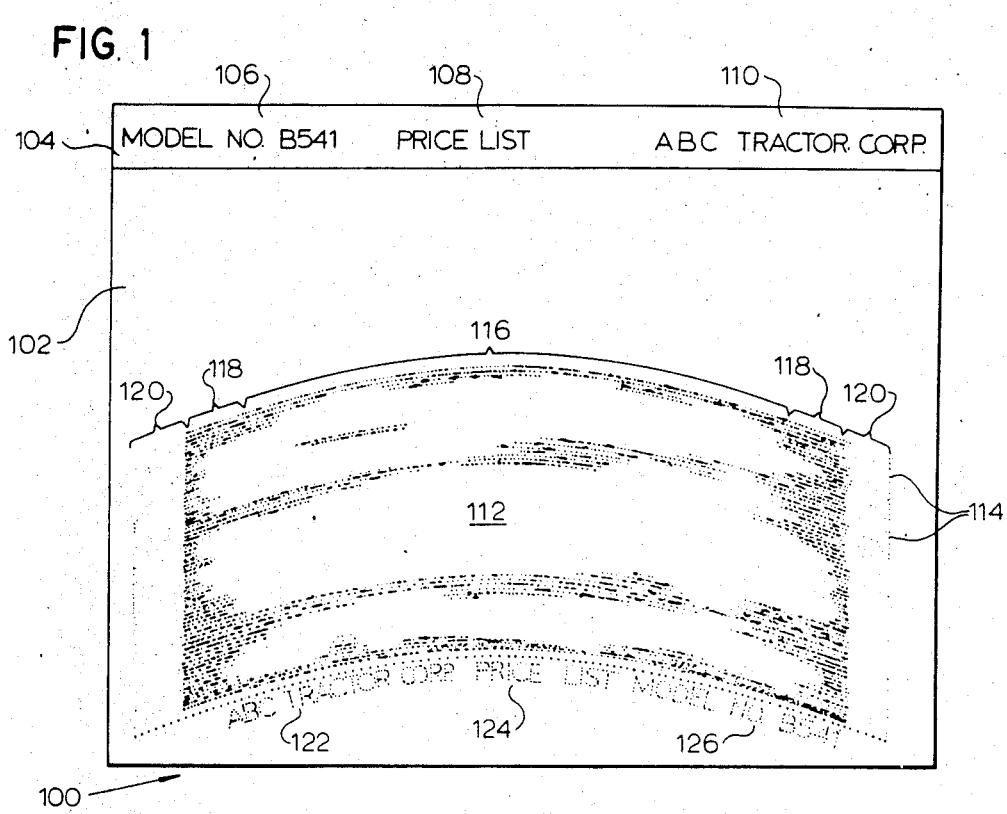
FIG. 1 is a plan view of a data record carrier of the type which can be read by an apparatus for reading same constructed according to the teachings of the present invention.

Referring now to FIG. 1, there is illustrated therein a data record carrier which is read by a reading apparatus constructed according to the teachings of the present invention and which is generally identified by reference numeral 100. The data record carrier 100 comprises a body 102 which may have a header 104 affixed thereto. The header 104 may include visually perceptible information, as indicated at 106, 108 and 110, dealing with, for example, the price list relating to a particular model number manufactured by a particular manufacturing organization. This information could also relate to any type of inventory and may find particular use in the banking, hardware, hospital and pharmaceutical areas.

The digital data information relating to each element, which may be a part of a price list, for example, is recorded in a plurality of arcuately nested spaced-apart rows 114 of equal radius. The rows 114 of digital data information are disposed in an area 112 of the body 102.

Although an operating program may tell a machine the address of a row 114 with respect to distances from a datum line, so that the machine itself will respond accordingly to access the proper row, each row may include a row address at either or both ends, as indicated by reference numeral 118, with the digital data to be retrieved located therebetween, such as at 116. The address information 118 may also be interspersed along the respective row 114, assuming that the hardware and software is set up to read in such a manner.

The body 102 of the data record carrier 100 may be in the form of paper, plastics or the like, or may be a photographic film in which the background may be transparent or dark and the individual information dots may be of opposite character. The dots themselves may contain the digital information such that a dark dot on a light or transparent background may be considered a "1" or such that a light dot on a dark background may represent a "1". Preferably, however, and notwithstanding the transparency of the background, the information is contained in the opaque-to-transparent and transparent-to-opaque transitions. The transparency and opaqueness of a medium, for example a photographic film, is not limiting with respect to practicing the present invention. The information might be stored with respect to reflective elements carred by the body, whether the body is transparent or opaque. Again, the information may be stored as a result of the reflective material being present or absent, or may be and preferably is stored with respect to the transitions between the reflective and nonreflective areas.

A camera for producing such a data record carrier 100 also has the capability of providing, in place of or in addition to the information 106, 108 and 110 carried on the header 104, the same or additional information on the film, as indicated at 122, 124 and 126, in the same manner as recording of the digital information. Such information may be graphic and/or digital, where graphic means all types of information, including alphanumeric, drawings, symbols and the like.

Each row or track 114 on the data record carrier 100 may also comprise a leader and/or trailer 120 of indicia, which informs the reading device of the beginning and ending of digital data on the row or track 114.

Referring now to FIGS. 2 and 3, a frame for one embodiment of a reading apparatus for practicing the present invention is generally identified by reference numeral 128 and includes a top plate 130 and a base plate 132 which are fixed generally parallel to one another, spaced-apart, by way of a plurality of spacers 134. A front plate 136 is also provided and extends between the top plate 130 and the base plate 132.

The top plate 130 includes an aperture 131 with an access plate 133 and carries, towards the rear thereof, a power supply 138 and a computer 140. The entire structure may be covered with a protective cover 142 which includes a slot 144 for alignment with a slot 146 in the front plate 136 to receive the data record carrier 100 therethrough. The cover 142 may also include an aperture 148 for receiving the operating member of an on-off switch 150.

The on-off switch 150 controls the application of power to the entire unit by way of a line cord and plug assembly 152 and transformer 154, the line cord being received through a mounting bracket 156 at the left-hand, rear corner of the unit.

The power cord 152 may terminate a terminal block 158 which services the power supply 138 by way of a fuse holder 160 and further connections (not shown).

A motor 162 is mounted at the left-hand, rear corner of the unit by way of a mounting bracket 164, and receives power from the terminal block 158 by way of a connector 166 and, possibly, via a motor on-off switch 168.

The motor 162, upon energization, constantly rotates a wheel or disc 174 by way of a belt 170 which is received in a groove 172 of the wheel 174' carried by the wheel 174.

Referring specifically to FIG. 3, a shaft 176 is rotatably mounted between the top plate 130 and the base plate 132. The shaft 176 is mounted in an upper bearing 178 received in a plate 180 which is affixed to the top plate 130 by way of screws 182. In a similar manner, a lower bearing 184 receives the shaft 176 and is mounted in a plate 186 which is affixed to the base plate 132 by way of screws 188.

Figure 5:
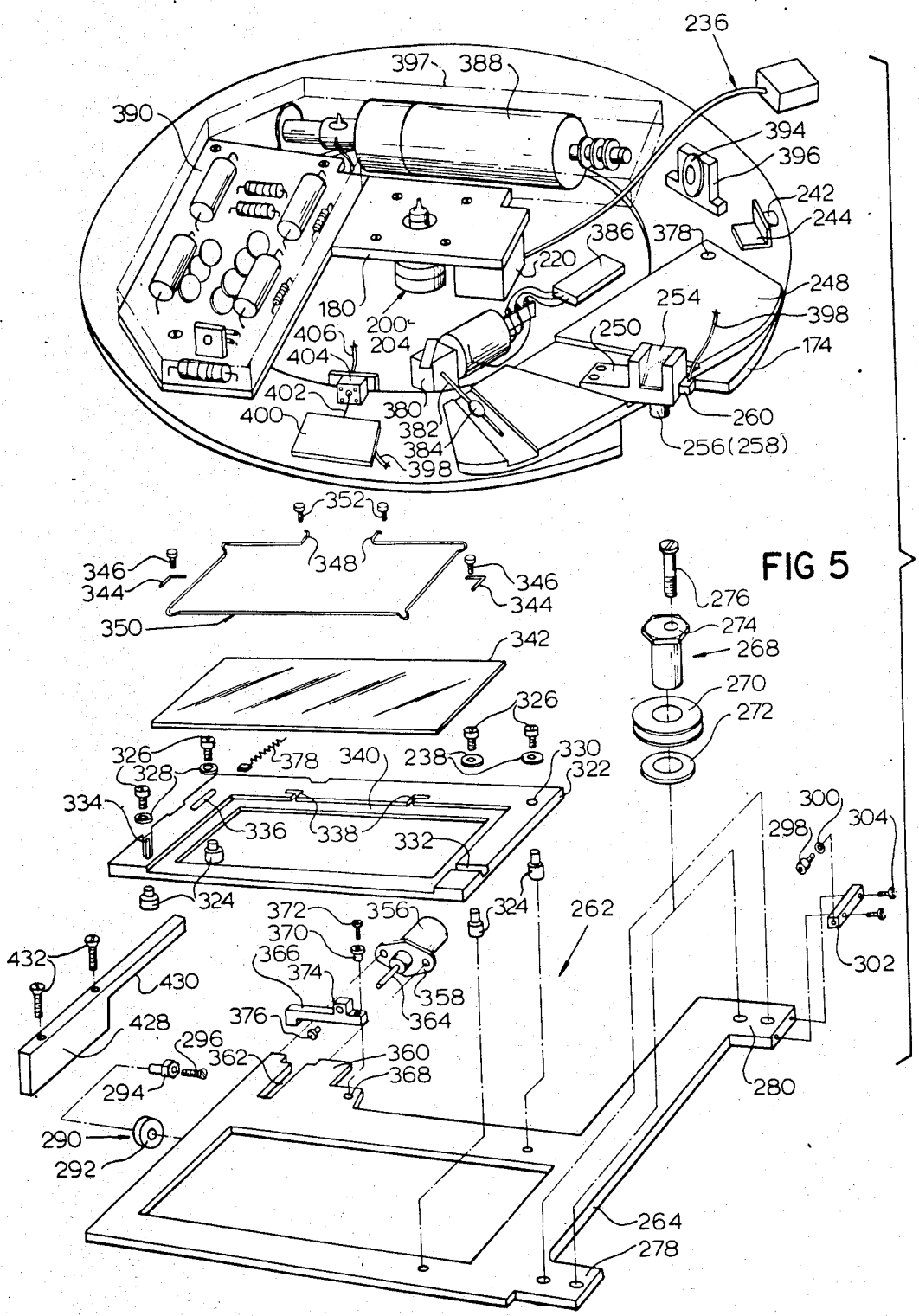
FIG. 5 is an exploded perspective view of the carriage structure shown in FIG. 4 and of a wheel which is mounted above the carrier structure and which carries a light source and light beam directing structure, as well as a radius control motor for adjusting the position of a light beam directing lens and pickup head to compensate for manufacturing tolerances, ambient temperature conditions and the like with respect to the size of the data record carrier.

The upper portion of the shaft 176 carries a first slip ring assembly, while the lower portion of the shaft carries a second slip ring assembly. The upper, first slip ring assembly comprises a plurality of slip rings 200, 202, 204 which are insulated with respect to the shaft, while the lower slip ring assembly comprises a pair of slip rings 206 and 208 which are also insulated from the shaft. The upper slip ring assembly comprises respective spring-loaded contacts (brushes) 210, 212, 214, while the lower slip ring assembly comprises a pair of spring-loaded contacts 216 and 218 (brushes). The upper brushes 210, 212, 214 are mounted in an insulating brush holder 220 which is secured to the plate 180 by way of a screw or screws 222 and a pair of plates 224 and 226. In the same manner, the lower contacts are held in a brush holder 228 which is secured to the plate 186 by way of a screw or screws 230 and a pair of plates 232, 234. As seen in FIG. 5, a connector and cable assembly 236 is provided to feed voltage potentials to the upper contacts 210, 212, 214; a similar arrangement being provided, but not shown, for the lower contacts 216 and 218. The contacts 200, 210 may carry, for example, +12 VDC; the contacts 202, 212 may carry ground; the contacts 204, 214 may carry ±19 VDC unregulated for the radius motor; and the contacts 206, 216 and 208, 218 may carry, for example, 700 VAC for the laser.

The wheel 174 includes a central aperture 190 which receives a portion of a stepped flange 192 and is secured thereto by a plurality of screws 194.

As shown and described, the motor 162 by way of the belt 170 rotates the wheel 174 between the top plate 130 and the bottom plate 132.

In reading data from the data record carrier 100, the computer 140 must know at which time the data record carrier 100 will be scanned. That is, the computer must know the position of the wheel 174, at least immediately prior to data scanning. For this purpose, and as shown in a cut-away portion of the plate 130 in FIG. 2, a bracket 238 mounts a Hall-effect device and supporting circuit for generating electrical pulses, as clock pulses, in each instance as the wheel 174 carries a mounting bracket 244 mounting a magnet 242 there past. Therefore, for each revolution of the wheel 174, a pulse is delivered to the computer (connections not shown) for clocking data retrieval with respect to rotation.

Figure 4:
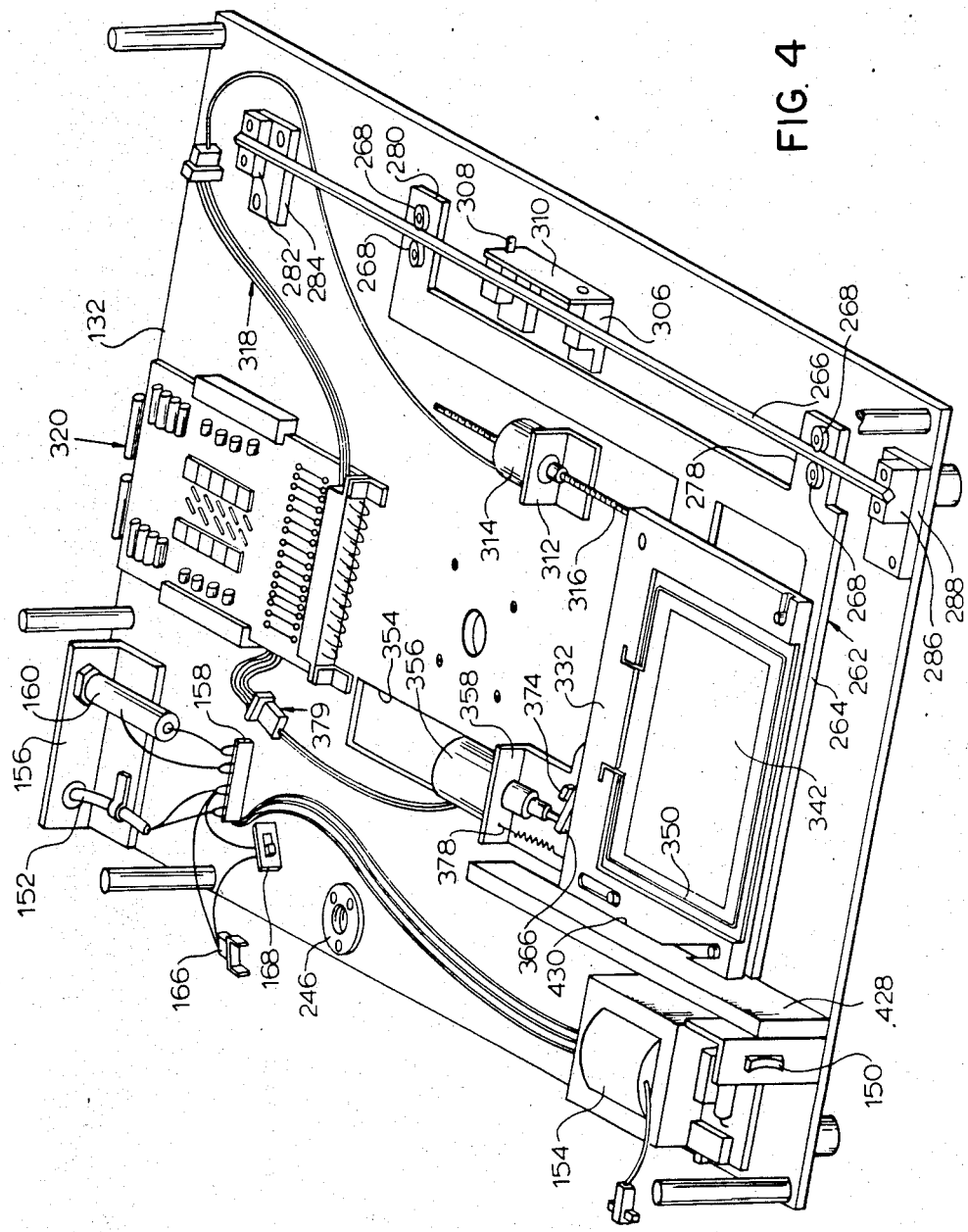
FIG. 4 is a perspective view of a base plate for the apparatus shown in FIG. 2 and shows a data record carrier support and carriage structure along with a skew correction motor and a carriage incrementing motor.

Referring again to FIG. 2, and as also illustrated in FIG. 4, the base plate 132 is provided with a threaded magnifier mounting ring 246. The mounting ring 246, when the unit is placed on its side, for example, receives a 50× magnifier for focusing. For this purpose, the wheel 174 is rotated such that a light beam via a prism 254 and a lens 258 (FIG. 3) are positioned above the mounting ring 246 and the magnifier. The lens 258 may therefore be adjusted to the focal plane of the data record 100, which plane is indicated in FIG. 3.

It should be pointed out here that the wheel 174 carries a plate 248 which mounts a prism holder 250 for holding a prism 254, the prism holder 250 receiving a lens mount 256 having a lens 258 therein. As the light beam, as indicated by broken lines, passes through the lens and is reflected from the media, the same is received, at an angle, for example 15°–60°, by a photo detector 260, such as a photodiode or a phototransistor. The angle chosen is one which will provide for reflection outside of the cone of specular reflection from the impinging light beam so that the detector only sees scattered light dispersed or scattered by light and dark data cells in the row or track 114. One angle which provides such exclusion of specular reflection is 45°.

Turning now to FIGS. 4 and 5, a carriage structure is illustrated in detail therein and includes a carrier 264 which is mounted for incremental movement along a track 262 as supported by a plurality of guide wheel assemblies 268 and a guide wheel assembly 290. Each guide wheel assembly 268 comprises a guide wheel 270, a spacer 272, an eccentric bushing 274 and a screw 76. These elements are all on the right-hand side of the unit. On the left-hand side of the unit, supporting the carriage, is a wheel 292 which is adjusted in height by an eccentric bushing 294 and a screw 296 to level the carriage.

FIG. 5 shows the guide wheel assemblies 268 carried on respective flanges 278 and 280. On the rear flange 280, a magnet 298, via a washer 300 is secured in a magnet mount 302 which is, in turn, secured by way of screws 304 to the end of the flange 280. The magnet 298 cooperates with (FIG. 4) a Hall-effect device 308 and supporting circuitry 310 which is mounted adjacent the track 266 by way of a pair of circuit board mounts 306. The movement of the magnet 298 toward and away from the Hall-effect device 308 (connections not shown) tells the computer 140 whether the carriage 264 is in the home position or is away from the home position.

In order to increment the carrier 264 along a common center line for each arcuate row or track 114 of digital data where each arcuate row or track 114 has the same radius and all the rows are arranged in an arcuately nested array, a carriage motor 314 is mounted to the base plate 132 by way of a mounting bracket 312 and includes a lead screw-type output shaft which is rotatably connected to the carriage 264.

As will be understood from a more detailed description below, the carriage motor 314 is controlled by a motor control circuit 320 (detailed in FIG. 6) via a cable assembly 318.

The carriage structure also comprises a skew pivot plate 322 which is mounted spaced from the carriage 264 by way of a plurality of spacers 324 and corresponding washers 328 and screws 326. The plate 322 includes a pivot hole 330, and a plurality of skew-accommodating slots 332, 334 and 336.

The skew plate 322 also includes a pair of L-shaped recesses 338 which open into a recess 340 in the top of the skew plate 322.

The recess 340 receives a glass or mirrow plate 342 which is held down by a pair of small L-shaped springs 344 and respective screws 346. The ends 348 of a media holding spring 350 are received in the recesses 338 and secured therein by way of a pair of screws 352.

Referring further to FIGS. 4 and 5, the base plate 132 includes an elongate aperture 354 for receiving the body of a skew motor 356 for movement therethrough in accordance with the movements prescribed by the carriage motor 314. The skew motor 356 includes a front mounting bracket 358 which is connected to the rear end of a projection 360 of the carriage 264. The projection 360 includes a shaped slot 362 for receiving the forward (output shaft) portion 364 of the motor 356, the output shaft 364 contacting a lever 366 which is pivotally mounted at 368 to the carriage 264 by way of a shouldered portion 370 and a screw 372. The lever 366 includes an arm portion 374, and an adjustable screw 376, for contacting the pivoting the skew plate 322, while a skew return or bias spring 378 is connected between the skew pivot plate 322 and the motor mounting flange 358 (FIG. 4).

In reading data from a data record carrier 100 of the type illustrated in FIG. 1, care must be taken to accommodate for the manufacturing tolerances and/or the temperature response of the data record carrier 100. For example, the accurate cutting of the data record carrier 100 in the direction across the data, that is vertically in FIG. 1, changes the radius of rotation with respect to the radius of the arcuate pattern. Also, expansion or contraction of the data record carrier 100 due to ambient conditions, changes this dimension. Therefore, apparatus is provided for accommodating radius changes due to manufacturing tolerances, ambient temperature and the like.

A radius correction structure is shown in the upper portion of FIG. 5. The radius correction structure adjusts the position of the axis of a light beam emanating from the lens 258. This structure comprises a radius motor 380 which has an output lead screw 382 connected to the plate 248 at a pivot 384, the plate being pivotally mounted on the wheel 174 at a pivot 378 by means of a bushing, screw and the like (not shown). The motor 380 responds to control signals received from a radius motor control circuit 386, which is shown in detail in FIG. 7. As the wheel 174 rotates and the initializing operations are performed, the computer determines the direction of movement of the lens 258 and operates the radius motor 380 accordingly.

The light beam is generated, preferably, by a laser generator 388 which is powered by a respective power supply 390 fed from the master power supply 138. The laser generator 388 and the power supply 390 may advantageously be enclosed in a protective cover 392. The beam generated by the laser generator 388 is projected toward the periphery of the wheel 174 where it strikes a mirror 394 mounted on a mirror mount 396 and is reflected to the prism 254 for direction downwardly through the lens 258.

As illustrated in FIG. 3, the light beam through the lens 258 strikes the data record and is reflected therefrom, modulated, to be received by the photodetector 260. The photo detector 260 has output leads 398 which are connected to a circuit 400 (FIG. 5) which is an optical/optical converter to eliminate noise having an optical output 402 connected to an optical connector 404 which feeds a fiber optic 406.

As illustrated in FIG. 3, the fiber optic 406 is received in a radial passageway 408 and extends up through an axial passageway 410 of the shaft 176 to an optical ferrule 112, whereupon the light emanating therefrom is detected by an optical detector 413 and fed to the computer 140 for buffering and the like.

Figure 11:
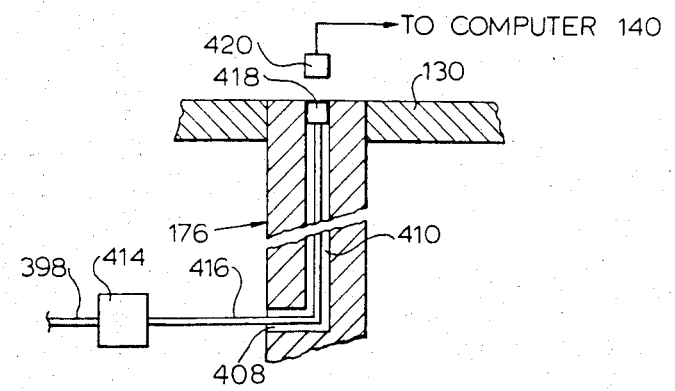
FIG. 11 is on the first sheet of drawings with FIGS. 1, 12 and 13 and is a fragmentary vertical sectional view of a structure for transferring a modulated light beam, as electrical signals, to a computer.

Referring to FIG. 11, a similar output may be had by providing the output leads 398 to a circuit 414 which is essentially a pulse shaper having output leads 146 which extend through the radial passageway 408 and the axial passageway 410 of the shaft 176 to a light-emitting element 418, such as a light emitting diode. Again, a photo detector 420, such as a photo diode or a photo transistor converts the light pulses to electrical pulses for feeding to the computer 144 for buffering and the like.

A motor control system for controlling the motors 314, 356 and 380 is schematically and approximately illustrated in FIGS. 6-10.

The motor control circuit board 320 associated with the skew and carriage motors is illustrated in FIG. 6 as a plurality of identical circuits 422 each comprising an optical isolator 424 and a switching transistor Q. The alphabet letters indicate computer inputs for receiving carriage incrementing and skew adjustment signals, while the numbered outputs indicate, in connection with FIGS. 8 and 9, the connections to the coils of the skew and carriage motors.

The radius motor 380 is similarly controlled, but with a dual circuit comprising optical isolators 426 and respective transistors Q9 and Q10 in order to feed one polarity or another to the skew control motor.

FIG. 10 is a table showing the relationship of the control inputs and the responsive outputs for the carriage, skew and radius motors with respect to the circuits of FIGS. 6–9.

At times, it may be necessary to tilt the unit on its side, for example, in a focusing operation. To facilitate such a tilting, a carriage retaining structure may be provided for the left-hand side of the carriage. This structure comprises an L-shaped member 428 which includes a recessed surface 430 (from the bottom), secured to the base plate 132 by way of a pair of screws 432. As the carriage moves toward the front and toward the back, the left-hand edge thereof moves under the cut-out defining the surface 430 for retaining the carriage in the event of tilting for focusing, packing and the like.

Figure 12:
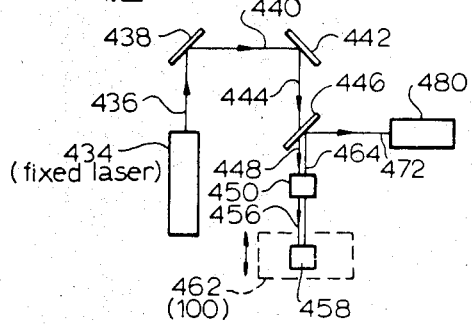
FIG. 12 is on the first sheet of drawings with FIGS. 1, 12 and 13 and is a diagramatic top plan view representation of a fixed light source with a rotating beam directing system.
Figure 13:
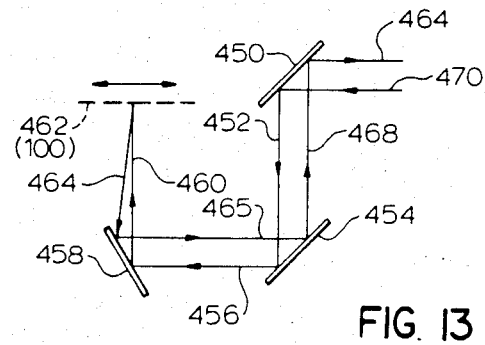
FIG. 13 is diagramatic side view representation of the light source on rotating beam directing system as shown in FIG. 12.

An alternative optical system is illustrated in FIGS. 12 and 13. A top view of the system is shown in FIG. 12, and a portion of the optical system of FIG. 12 as seen from the right-hand side, is shown in FIG. 13 inasmuch as the optical system of this embodiment covers at least three planes. In FIG. 12, and with a frame similar to that discussed above, a laser device 434 is fixed and emits a light beam 436 which is reflected to the right by a mirror 438 to form a beam segment 440 which, in turn, is reflected forwardly by a mirror 442 to form a beam segment 444. The beam segment 444 travels to a beam splitter 446 which passes a beam segment 448 to a prism 450 (shown as a mirror in FIG. 13 for simplicity) on the axis of the rotating wheel. The prism 450 directs a beam segment 452 downwardly to a second prism 454, also on the axis of rotation which, in turn, directs a beam segment 456 toward a mirror 458 for reflection upwardly toward a data record 462 (100) which is movable incrementally toward the front and toward the back of the unit. The reflected light beam segment 464 again strikes the mirror 458 at a slight angle and is reflected as a beam segment 466 to the prism 454, where the same is redirected as a beam segment 468 to the prism 450. The prism 450 again reflects the modulated beam as a segment 464 to the beam splitter 446 where the modulated beam is reflected as a beam segment 472 to a photo detector 480 for conversion into an electrical signal and transmission to the computer 140 for buffering, output and the like.

It should be noted that in the embodiment of FIGS. 2–5, as far as the mechanical rotating structure is concerned, and in the embodiment of FIG. 11, and in the embodiment of FIGS. 12 and 13, slip rings and the like for outputting the optical signal are not required.

Figure 14:
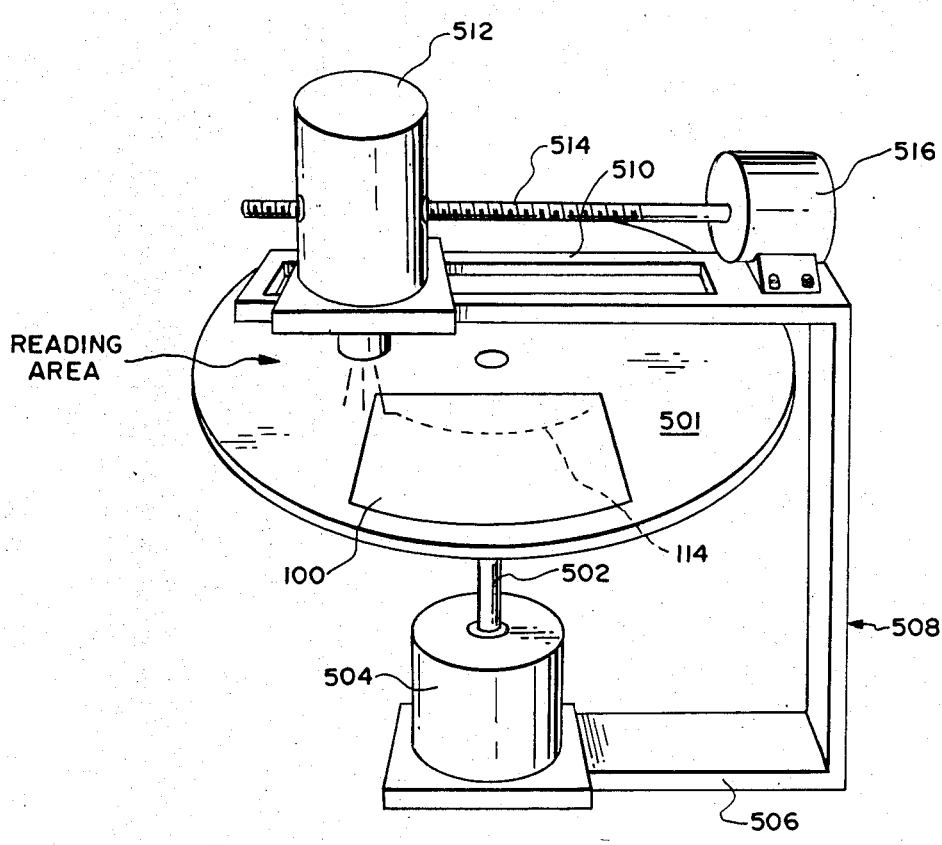
FIG. 14 is a perspective view of another embodiment of a reading apparatus constructed according to the teachings of the present invention wherein a data record carrier is rotatable on a turntable and a laser and detector (hidden from view) are stationary during the reading of a track and then are incremented by an incrementing motor.

In FIG. 14 there is illustrated, more or less graphically or schematically, an alternative system for reading the data record carrier 100. In this system, the data record carrier 100 is mounted on a turntable 501 which is supported at the upper end of a shaft 502 driven by a motor 504. The motor 504 is supported on a base portion 506 of a framework 508 that has an upper portion 510 positioned above the turntable 501. A laser and detector assembly 512 is mounted on the upper frame portion 510 for slidable movement thereon and its position is determined by a threaded drive shaft 514 engaging a threaded aperture in the assembly 512. The threaded shaft 514 is operated by a motor 516 which is controlled by sensing circuitry which senses when one track or row 114 has been read and the assembly 512 can be incremented a distance on a radius from the axis of rotation of the shaft 502 equal to the space between adjacent rows or tracks 114.

Figure 15:
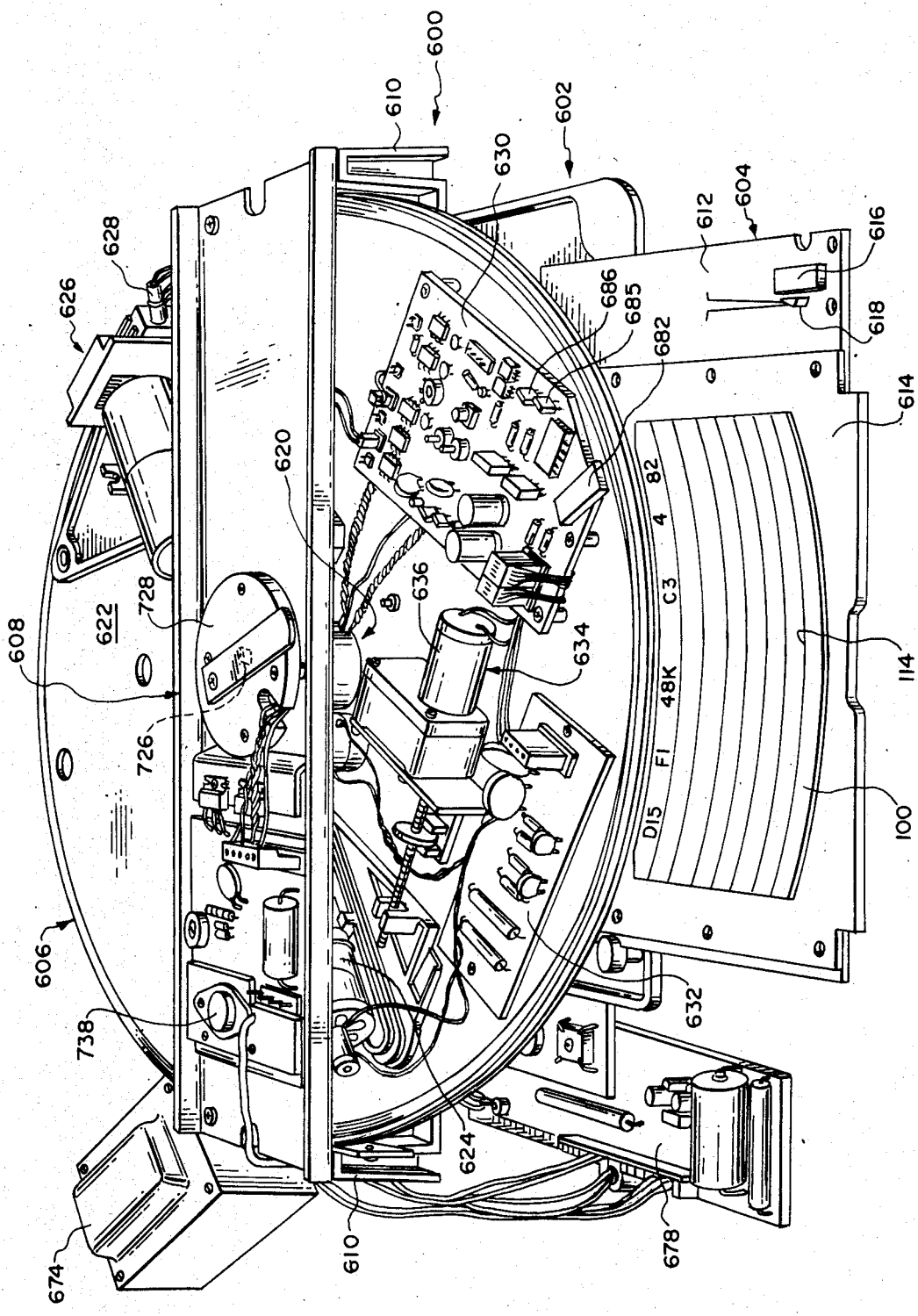
FIG. 15 is a perspective view of still another embodiment of a reading apparatus constructed in accordance with the teachings of the present invention and is shown without a housing or cover thereover.

Referring now to FIG. 15 there is disclosed therein another and preferred embodiment of the reading apparatus of the present invention which is generally identified in FIG. 15, with the cover or housing thereof removed, by reference numeral 600. The reading apparatus 600 includes a base casting 602 on which is mounted a carriage structure 604, a turntable 606 and an upper bridge member 608.

The base casting 602 includes upright supports generally identified by the reference numeral 610 for supporting the bridge member 608 across the base casting 602 and above the turntable 606 and carriage assembly 604.

The base casting 602 will be described in greater detail in connection with the description of FIG. 17.

Supported on the base casting 602 is the carriage assembly 604 which includes a carrier 612 and a data record carrier hold down plate 614. In use, the data record carrier 100 is held by the hold down plate 614 on the carrier 612.

The carrier 612 has a magnet 616 mounted thereon as shown. A magnetic sensor 618 which depends from framework within the housing (not shown) is positioned at the home or most outward position of the magnet 616 on the carriage 612 from the axis of rotation of the turntable 606. In other words, as described above in connection with the reading apparatus shown in FIGS. 2–5, the carrier 612 is adapted to be moved inwardly toward the axis of rotation of the turntable 606 for reading in a sequential manner rows 114 of data on the data record carrier 100. However, its normal position or home position is where the carrier 612 is in its most retracted position from the axis of rotation of the turntable 606. The sensor 618 is positioned at a location that corresponds to this most retracted or home position of the carrier 612. In other words, when the carrier 612 is in its most retracted position, the magnet 616 thereon will be adjacent the sensor 618 to generate a signal indicating that the carrier 612 is at its home position.

Other details of construction of the carriage assembly 604 will be described below in connection with the description of FIG. 16.

The turntable 606 is mounted for rotation on the base casting 602 as will be described in connection with FIGS. 16, 18 and 19 and receives power from a transformer 620, part of which is mounted on a top surface 622 of the turntable and another part of which is mounted beneath the bridge member 608 as will be described further in connection with the description of FIGS. 18 and 19.

Mounted on the turntable 606 is a laser tube 624, a lens and prism assembly 626, a detector 628, a low voltage power supply and A/D circuit board 630, a laser high voltage power supply circuit board 632 and a radius adjust assembly 634 including a radius adjust motor 636.

It will be appreciated that once a data record carrier 100 is mounted on the carriage assembly 604, the carriage assembly is operated to move the carrier 612 inwardly toward the axis of rotation of the turntable 606. The turntable will be rotated by a belt (belt 666 in FIG. 18) so that the laser beam from the laser tube 624 can be directed by the lens and mirror assembly 626 downwardly onto a track 114 on the data record carrier 100. The light reflected as the light beam from the laser impinges upon light cells or dark cells on the track 114 will be picked up by the detector 628 and converted to electrical signals which are passed to a computer for processing the data signals.

Preferably, data cells in the rows or tracks 114 on the data record carrier 100 are constructed and coded on the body 102 in the manner described in copending U.S. application Ser. No. 445,241 entitled: CODED DATA ON A RECORD CARRIER AND METHOD FOR ENCODING SAME, the disclosure of which is incorporated herein by reference.

After one row or track has been scanned by the directed laser beam from the laser tube 624 and scattered reflected light or lack thereof, has been picked up by the detector 628, the carriage assembly 604 is activated to index the carrier 612 inwardly toward the axis of rotation of the table 622 a distance equal to the distance between the center line of each track 114 and a subsequent or succeeding row or track 114 is scanned by the laser beam.

The scanning and reading of the tracks or rows 114 on the record carrier 100 continues in the manner described above until all of the tracks or rows 114 have been read. At this time, the carriage assembly 604 is operated to return the carrier 612 to its home position farthest away from the axis of rotation of the turntable 606 and this home position is sensed by the sensor 618 as described before.

The reading apparatus 600 can be referred to as a scanning and reading apparatus 600 since what occurs is the scanning and reading of the data encoded in the rows or tracks 114. In this respect, the laser tube 624 and the lens and mirrow assembly 626 function to direct a coherent laser beam of light downwardly from the turntable 606 as the turntable 606 is rotated. As a result, the axis of the beam of light is rotated about the axis of the turntable 606 and this light is moved along an arcuate row or track 114 on the data record carrier 100.

Each row or track 114 has a plurality of data cells which are illustrated and described in greater detail in copending application Ser. No. 445,241. These cells are typically represented by reflective or non-reflective areas which are established by light or dark areas. The data cells are comprised of all dark or all light areas over a cell width or half light and half dark areas over a cell width. Where there is no transition over a cell width such as an all dark or all light cell, such cell is typically referred to as a non-transition cell and is typically interpreted as a logic 0 bit of data. Then, for cells that are half light and half dark where a transition occurs somewhere across the width of the cell, such data cell is referred to as a transition cell and the occurrence of such transition is interpreted as a logic 1 data bit.

Thus, as the light beam impinges upon a dark area, no light is scattered or insufficient light is scattered to be picked up by the detector 628. Then, when the light beam impinges on a light area, light is scattered and scattered or dispersed light outside the cone of specular reflection is picked up by the detector 628 which is typically positioned at an angle of 45° to the point of light impingement on the data record carrier 100. The transitions sensed in this manner by the detector 628 and the length of period between a transition, indicates whether a logic 0 data bit or a logic 1 data bit has been "read" from the data record carrier 100. In any event, the electrical signal generated by the sensing of the scattered light outside the cone of specular reflection is converted to electrical signals that indicate a logic 0 or a logic 1 data bit and supplied to a computer for decoding the data and processing same.

Figure 16:
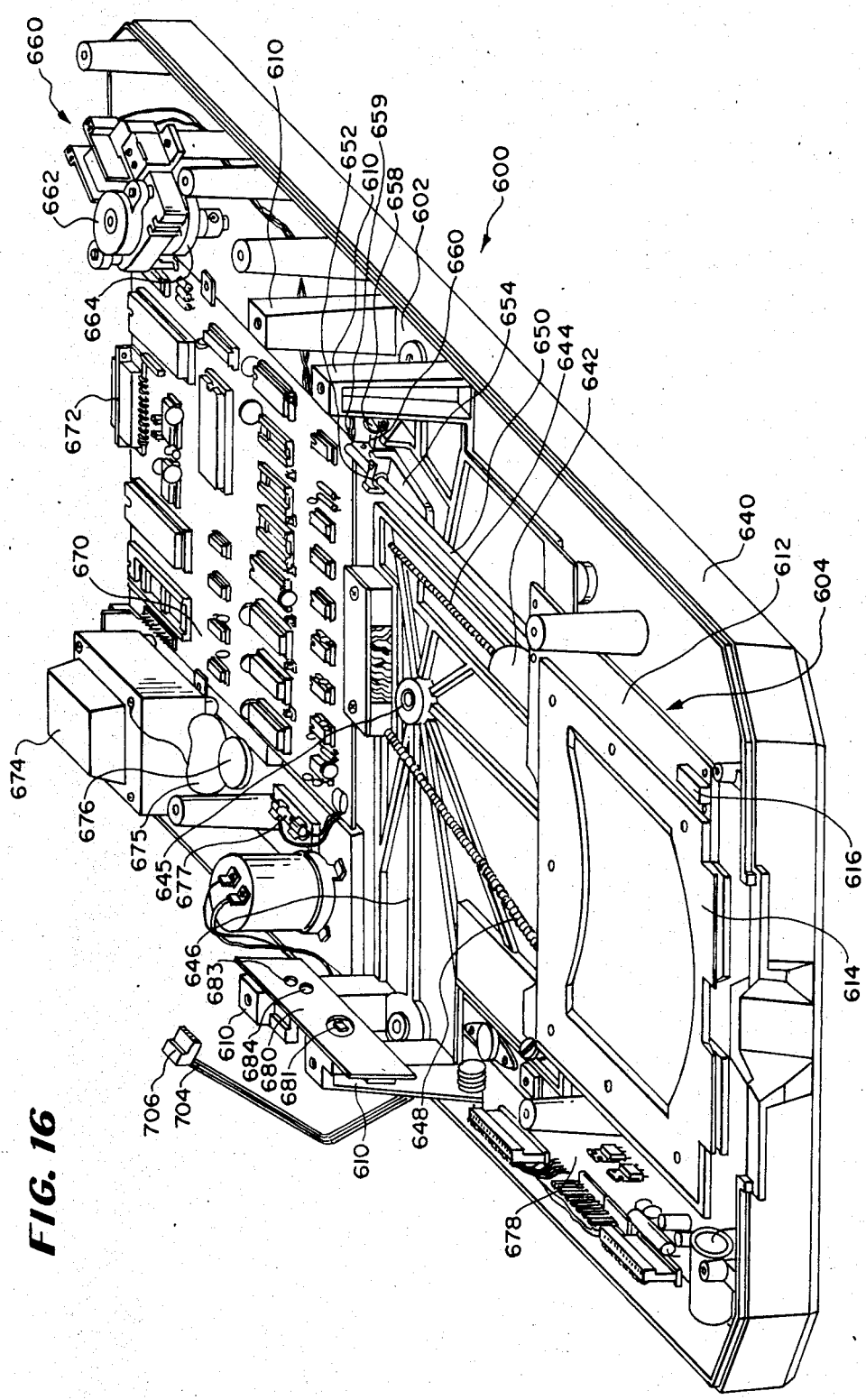
FIG. 16 is a perspective view of a base casting circuit board, carriage structure and wheel drive motor in the apparatus shown in FIG. 15 with a turntable and a bridge member omitted.

Referring now to FIG. 16, there is illustrated therein the scanning and reading apparatus 600 of the present invention with a lower cabinet wall portion 640 around the apparatus 600 and the base casting 602 thereof and with the turntable 606 and bridge 608 removed. Here it can be seen that the carriage assembly 604 includes a carriage motor 642 which drives a threaded shaft 644. It will be understood that as the motor 642 rotates the shaft 644, such shaft 644 journalled in a threaded bore in the casting 602 will cause the carrier 612 to move toward or away from the axis of rotation of the turntable 606 which is the axis of a support hub 645 that forms part of the casting 602 and which has spider-like spokes 646 extending therefrom to other parts of the casting 602. A carriage or carrier return spring 648 is also provided and connected between the carrier 612 and a portion of the base casting 602 adjacent to the support hub 645 on the left-hand side of the carriage assembly 604 as shown in FIG. 16. This biases the carrier 612 toward the right-hand side thereof which includes a tracking mechanism defined by a guide rod 650 which is pivotally connected to the underside of the carrier 612 at one end and slidably received through a bearing 652 in a skew bracket 654 that is pivotally mounted at a pivot 656 to the base casting 602. A skew adjust motor 658 is mounted to the casting 602 and has a screw threaded shaft 660 received within a threaded bore of the bracket 654 so that rotation of the shaft 660 by the motor 668 will cause the bracket 654 to pivot about the pivot point 656 and thereby laterally move the position of the bearing 652 relative to the direction of in and out movement of the carrier 612. A return spring 669 is connected between the bracket 654 and the casting 602 for urging or pulling the bracket 654 toward the motor 659.

From the foregoing description of the carriage assembly 604 and the skew adjust mechanism forming a part thereof, it will be apparent that when an arcuate row or track 114 on a data record carrier 100 mounted on the carrier 612 is not congruent or in line with a radius of the arcuate line of movement of the beam of light being directed downwardly from the rotating turntable 606, assuming that they both have the same radius, the skew adjust motor 658 is operated to move the carrier 612 laterally to the right or left of its linear path of travel toward and away from the axis of the hub 645 thereby to adjust for skew or non-alignment.

Also shown in FIG. 16 are other components of the scanning and reading apparatus 600. In this respect, at the upper right-hand corner is illustrated a turntable drive motor assembly 660 including a drive motor 662 which drives a wheel 664 around which is trained a drive belt 666 (FIG. 18).

Further, a controller board 670 is mounted on the casting 602 and has an RS 232 connector 672 thereon for coupling to a computer which is typically mounted within the housing (not shown) of the scanning and reading apparatus 600 but which could be in a separate micro, mini or main frame computer which is coupled to the apparatus 600 through the connector 672.

Other components of the apparatus 600 are also shown in FIG. 16 and mounted within the lower housing portion 640. For example, a power transformer 674 is shown which is connected at one end to a conventional cord and plug assembly and which has an output that is connected to line filters 675 and 676 and then through a fuse 677.

Also, a power supply circuit board 678 is mounted within the lower housing portion 640.

Figure 18:
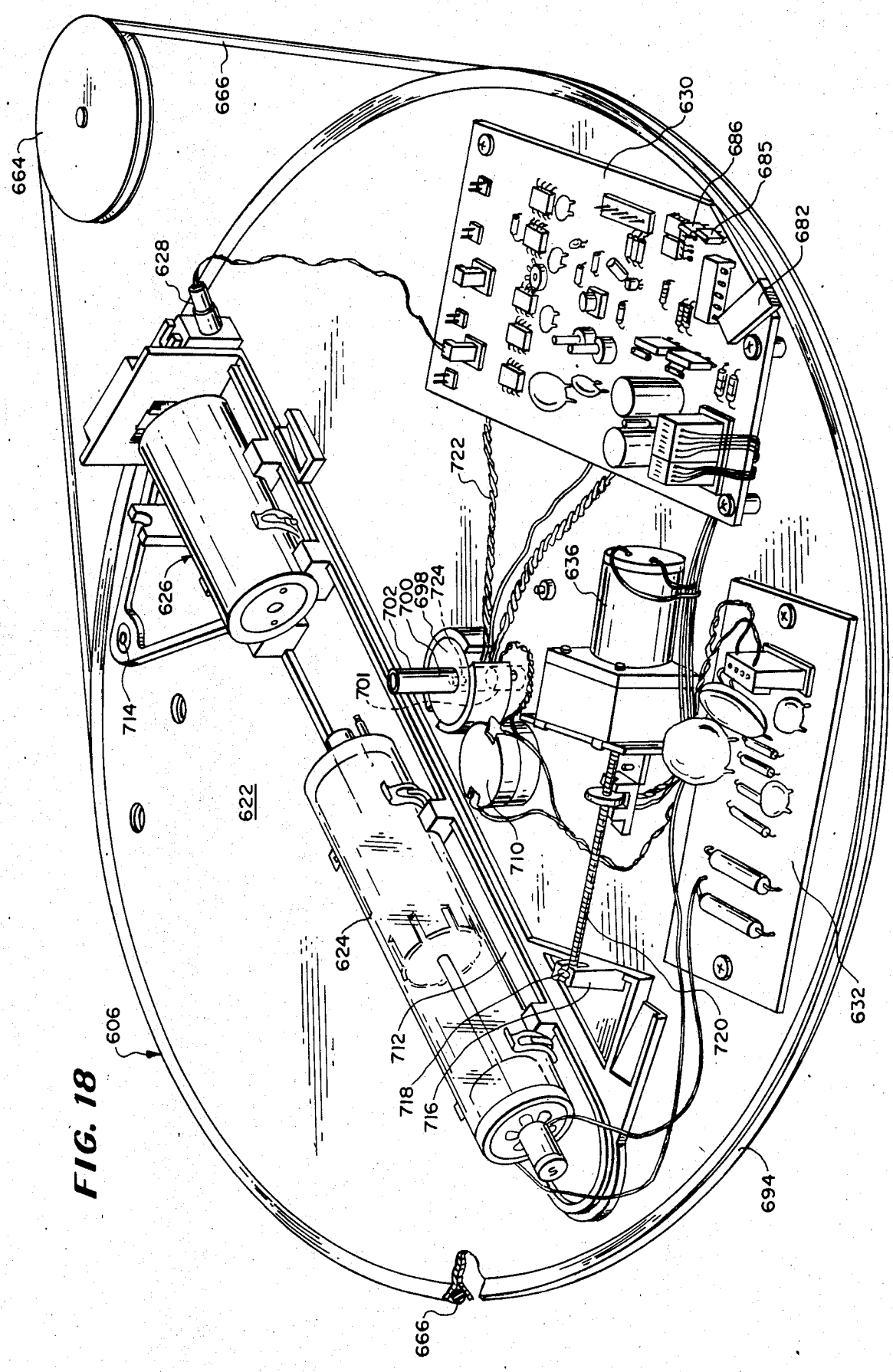
FIG. 18 is a perspective view of the turntable showing a laser tube, a lens and prism assembly, a detector, and a radius adjust mechanism mounted thereon.

Additionally, mounted on the supports 610 on the left-hand side of the apparatus 600 is a sensor board 680 having a Hall-effect sensor device 681 for sensing the position of the turntable 606 by sensing the position of a magnet 682 (FIG. 18) mounted on the circuit board 630 (FIGS. 15 and 18).

Also mounted on the sensor board 680 are two light emitting diodes which are hidden from view, but which emit light through two ports 683 and 684 in the board 680. The light from these LED's is received by two optical sensors 685 and 686 (FIGS. 15 and 18).

When the information or data picked up off a track on the data record carrier indicates that the tracks 114 or at least the one being scanned and read, is not in line with the arc of rotation of the rotating light beam, the skew adjust motor 658 is operated to adjust the skew or line of movement of the carrier 612 toward the axis of the hub 645. Then, if a further interpretation of the data picked up from the track 114 on the data record carrier 100 indicates that the radius of the arc travelled by the light beam is greater or less than the radius of the arcuate track 114 being read, one of the light emitting diodes from one of the ports 683 or 684 is activated to send a signal to the receiving sensor 685 or 686 to cause the radius adjust motor 636 to be energized to move the axis of the light beam being directed by the lens and mirror assembly 626 downwardly onto the data record carrier 100 (which is commonly referred to as the media 100) until it is determined that the radius of the arcuate path travelled by the light beam is substantially the same as the radius of the track 114.

Depending upon which sensor 685 or 686 receives light, the radius adjust motor 636 will cause the position from which the light beam is directed downwardly from the lens and mirror assembly 626 to be moved inwardly or outwardly from the axis of rotation of the turntable 606.

Figure 17:
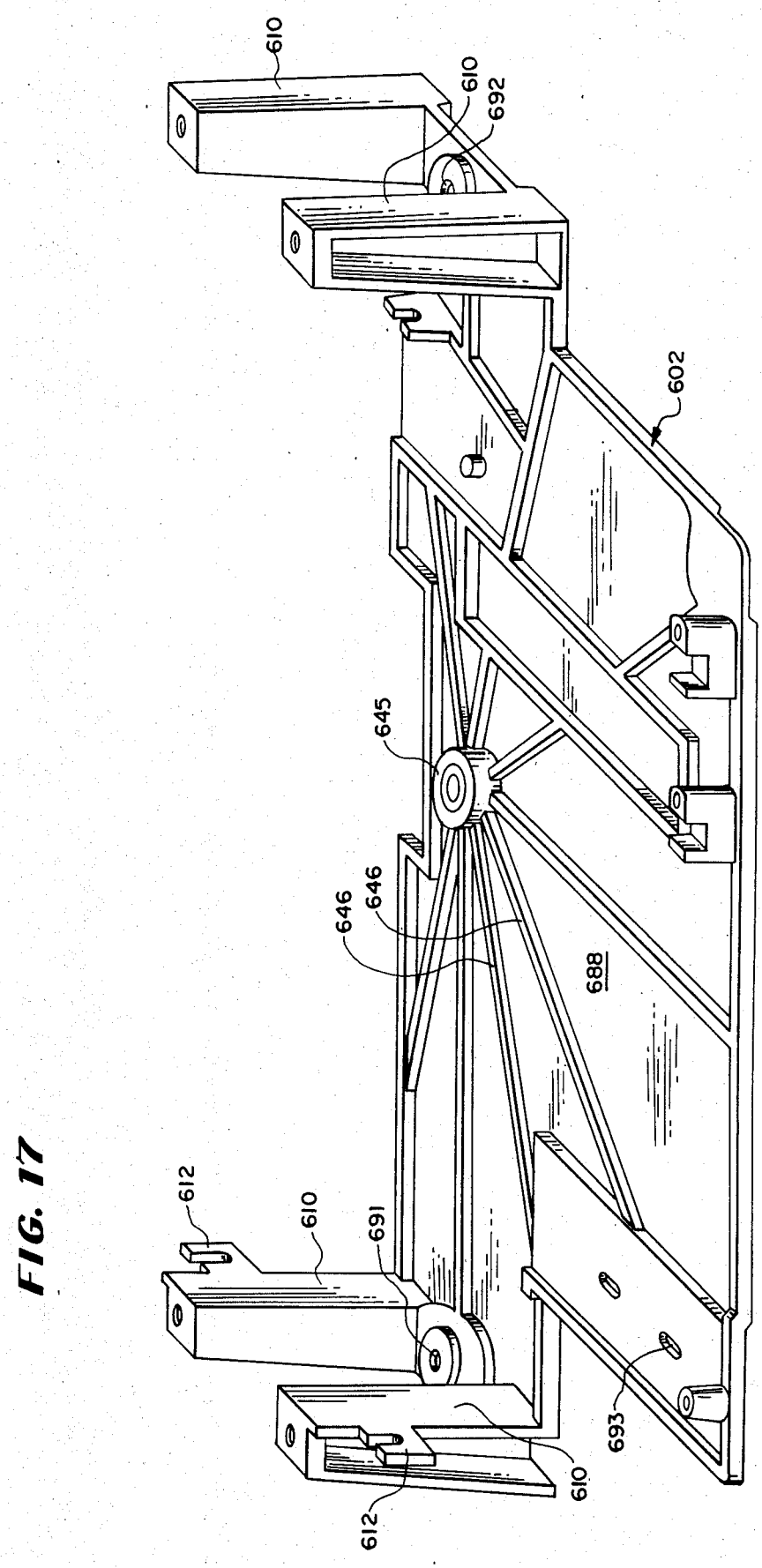
FIG. 17 is a perspective view of the base casting shown in FIG. 16.

Referring now to FIG. 17, there is illustrated therein the base casting 602 with the upright supports 610. As shown, the supports 610 on the left-hand side of the casting 602 have flanges 687 for mounting the sensor board 680. Also it will be apparent that the radial spoke members 646 are integral with and on top of a thin base plate 688. Although hidden from view, it will be understood that under three mounting holes 691, 692 and 693 are situated depending bosses which provide a good three point support for the base casting 602 on the floor of a housing (not shown) for the base casting 602.

Referring now to FIG. 18, there is illustrated therein the turntable or wheel 606 which has a groove 694 in the edge thereof in which there is received the belt 666 for being driven by the wheel 664 driven by the motor 662 shown in FIG. 16.

Figure 19:
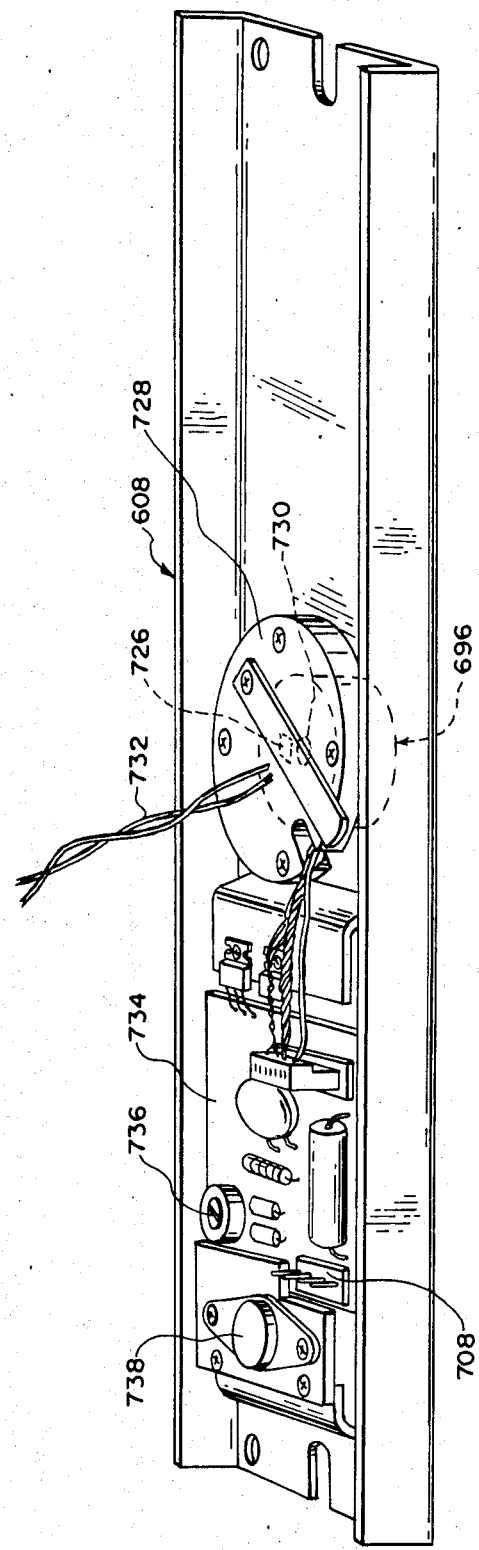
FIG. 19 is a perspective view of the bridge plate which is mounted over the turntable shown in FIG. 18.

The transformer 620 includes a primary winding or first core portion 696 shown in FIG. 19 and a secondary winding or second core portion 698 mounted in the middle of the turntable 606 and fixed thereto. A shaft 700 extends through and is fixed to the second core portion 698 and has a lower portion 701 which is rotatably journalled within a bore in the hub 645 and an upper shaft portion 702 which is rotatably journalled in a bore of the first core portion 696.

It will be appreciated that the second core portion 698 and shaft 700 rotate with the turntable 606.

Power from the transformer 674 is converted to a high frequency alternating current such as at a frequency of 20,000 Hz by a power supply circuit on the circuit board 678 and fed by a cable 704 to a plug 706 which plugs into a connector 708 on the bridge 608 shown in FIG. 19 to supply the high frequency current to the primary winding or first core member 696. The power in the primary 696 is then transferred to the rotating secondary winding 698. Since the turntable is rotating at approximately 2 Hz while the alternating current is at 20,000 Hz, a good electrical coupling is established between the stationary primary winding 696 and the rotating secondary winding 698 of the transformer 620. In this way, power is supplied from the secondary winding 698 to a power supply on the circuit board 630 for converting optical signals picked up by the detector 628 to electrical signals and for providing power to the radius adjust motor 636. Also, power is supplied from the secondary winding 698 to a high voltage transformer 710 which supplies power via the circuit board 632 to the laser tube 624.

As shown, the laser tube 624 is mounted on a plate 712 which is movable about a pivot 714. This pivot point 714 is close to an opening (hidden from view) in the turntable 606 through which light is directed from the lens and mirror assembly 626 downwardly toward the carrier 612. At the other end of the plate 712 is an upright flange 716 having mounted therein a threaded nut 718 in which a threaded shaft 720 is received. As shown, the threaded shaft 720 is driven by the radius adjust motor 636 which is fixed or mounted on the turntable 606. In this way, rotation of the shaft 720 through the nut 718 will cause the plate 712 to rotate about the pivot 714 which causes the axis of the light beam being directed downwardly from the turntable 606 to be moved in an arc which, for a short portion of the arc, is considered to be a linear path toward and away from the axis of rotation of the turntable 606. In this way, the radius of the arc of the moving light beam is altered by the radius adjust motor 636.

In order to communicate the digital data information picked up by the detector 628 to a microprocessor or computer from the rotating turntable 606, an electrical optical system is provided. In this respect, the optical signals picked up by the detector 628 are converted by a first optical to electrical system to electrical signals which are received by electrical circuitry mounted on the circuit board 630. There, the signals are amplified and transmitted by conductors 722 to a light emitting diode 724 mounted within the hollow shaft 700. This light is then directed upwardly through the hollow shaft 700 to a light detecting sensor 726 mounted within a cover member 728 on the bridge 608 as shown in FIG. 19.

Referring now to FIG. 19, there is illustrated therein the bridge 608 which is a channel-shaped member which has the primary winding or first core member 696 mounted to the undersurface thereof and which has an opening 730 therein through which light coming upwardly from the shaft 700 can pass to reach the light detecting sensor 726. The light detecting sensor 726 then converts the light received to electrical signals which are supplied via conductors 732 to the connector 672 for being supplied to computer circuitry. Typically, such computer circuitry will be a mini or micro computer e.g. a Commodore 64, mounted outside of the housing for the apparatus 600. Also, it is to be appreciated that the light emitting device 724 and the light sensing device 726 could be bi-functional devices which can receive or emit light and can emit or receive electrical signals. With such bi-functional devices 724 and 726, a microprocessor could be mounted on the turntable 606 and communicate with a separate computer or microprocessor outside of the apparatus 600.

In addition to the connector 708 mounted on a transformer driver board 734, there is also mounted on the board 734 and bridge 608, a transformer voltage adjustment potentiometer 736 and a voltage regulator 738.

As stated previously, the bridge 608 is adapted to be mounted on the top of the upstanding support 610.

Although two magnetic systems are shown for sensing the position of the carrier 612 and the position of the turntable 606, it is to be understood that the one system comprising magnet 616 and sensor 618 can be replaced by an optical sensing system and the other system comprising the sensor 681 and the magnet 682 can also be replaced by an optical sensing system.

The computer within the apparatus 600 or coupled thereto has a program or software which is adapted to cause the carriage motor 642 to increment the carrier 612 in steps which are typically 0.001 inch. On the other hand, the thickness or width or each track 114 will vary between 0.006 inch to maybe 0.020 inch. Typically this width or thickness of a track 114 is 0.008 inch as described in copending application Ser. No. 445,241. As a result, a read or scan of each track 114 can take place along several, e.g., eight, adjacent arcuate paths of travel along the track 114.

Accordingly for determining whether the skew adjust motor 658 needs to be operated or the radius adjust motor 636 needs to be operated, the computer program first causes movement of the carrier 612 by operating the motor 642 in 0.001 inch steps so as to find a track 114 and once a track 114 is found and whichever track address is read first on a complete scan indicates the amount of skew adjust that is required. If both the front and back address are read on a scan, no skew adjust is needed. The carrier 612 is then incremented in 0.001 inch steps to see if, for all eight scans, both track addresses are read. If not, and only one track address is read on the first or eighth scan, then it is determined that the data record carrier 100 is skewed and the skew adjust motor is operated to correct for this skew.

Now in another subroutine once it is determined that the media 100 is not skewed relative to the arcuate path or travel of the light beam the carrier motor 642 is operated to move the media 100 to the first or 0 track which has a front, middle and back address. Then a scan is taken along the first path for the first step to see if all addresses are read. If the front, back and center addresses are all read on one scan, then there is no need for radius adjustment. However, if only the front and back addresses are picked up on a scan and not the center address, that means that the radius of the arc of travel of the light beam is too small and the radius adjust motor 636 is operated to increase the radius. This is done for all the eight possible scans of the zero track 114. Now if on the seventh or eighth scan of the track the center address is read and picked up but not the front and back addresses, that would indicate that the radius of the arcuate path of travel of the light beam is too large and must be reduced. Again, the radius adjust motor 636 is then operated to adjust the radius of the arcuate path of travel of the light beam.

Empirical tests have shown that the fine adjustment obtained with the radius adjust assembly 634 is not essential given a track width of 0.008 inch and that all that appears to be necessary is to provide skew adjust. Accordingly, the radius adjust assembly 634 can be omitted from the apparatus 600.

Figure 20A:
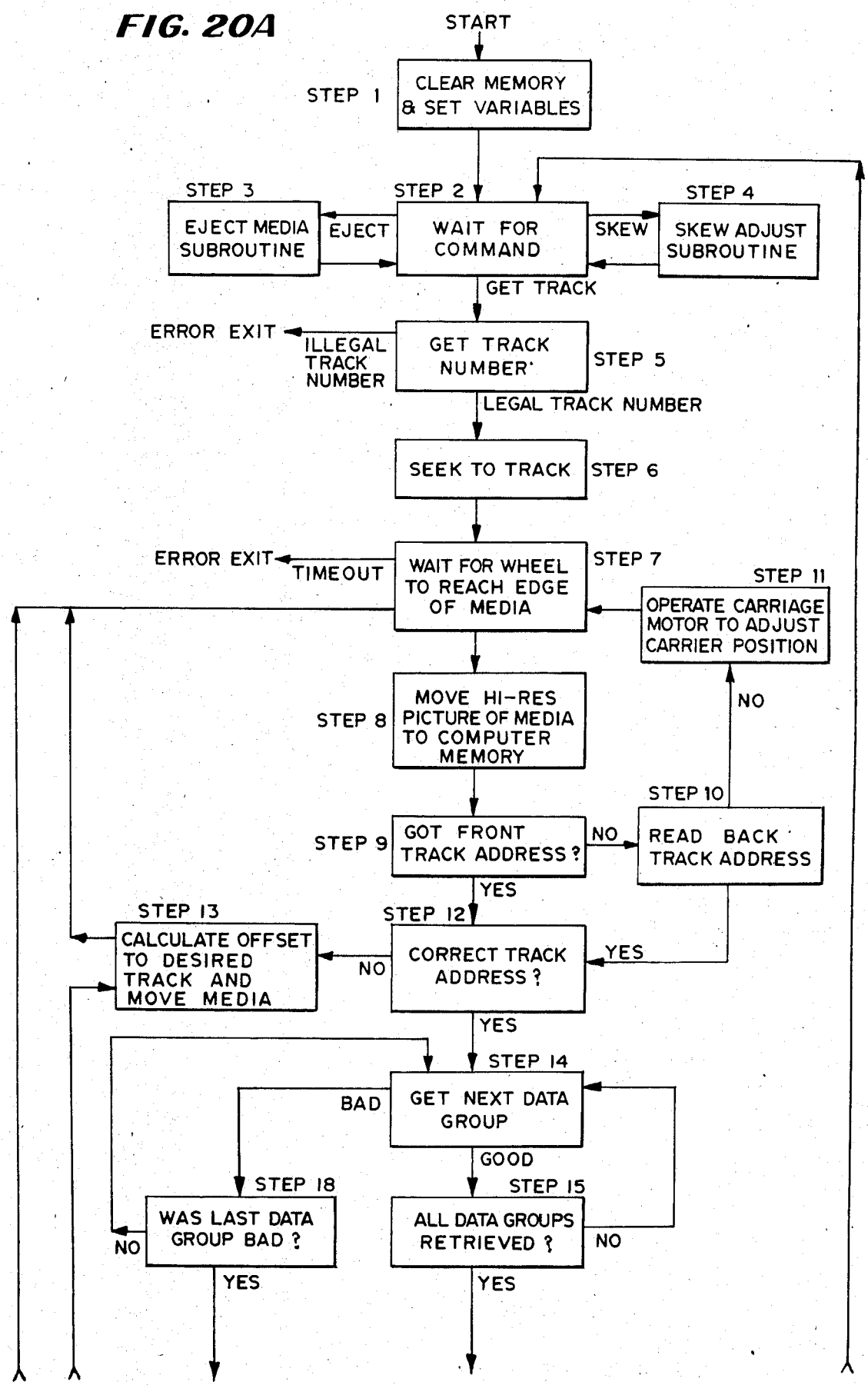
FIGS. 20A and 20B comprise together a flow chart of the various steps performed by a computer program in operating the reading apparatus shown in FIGS. 15-19.
Figure 20B:
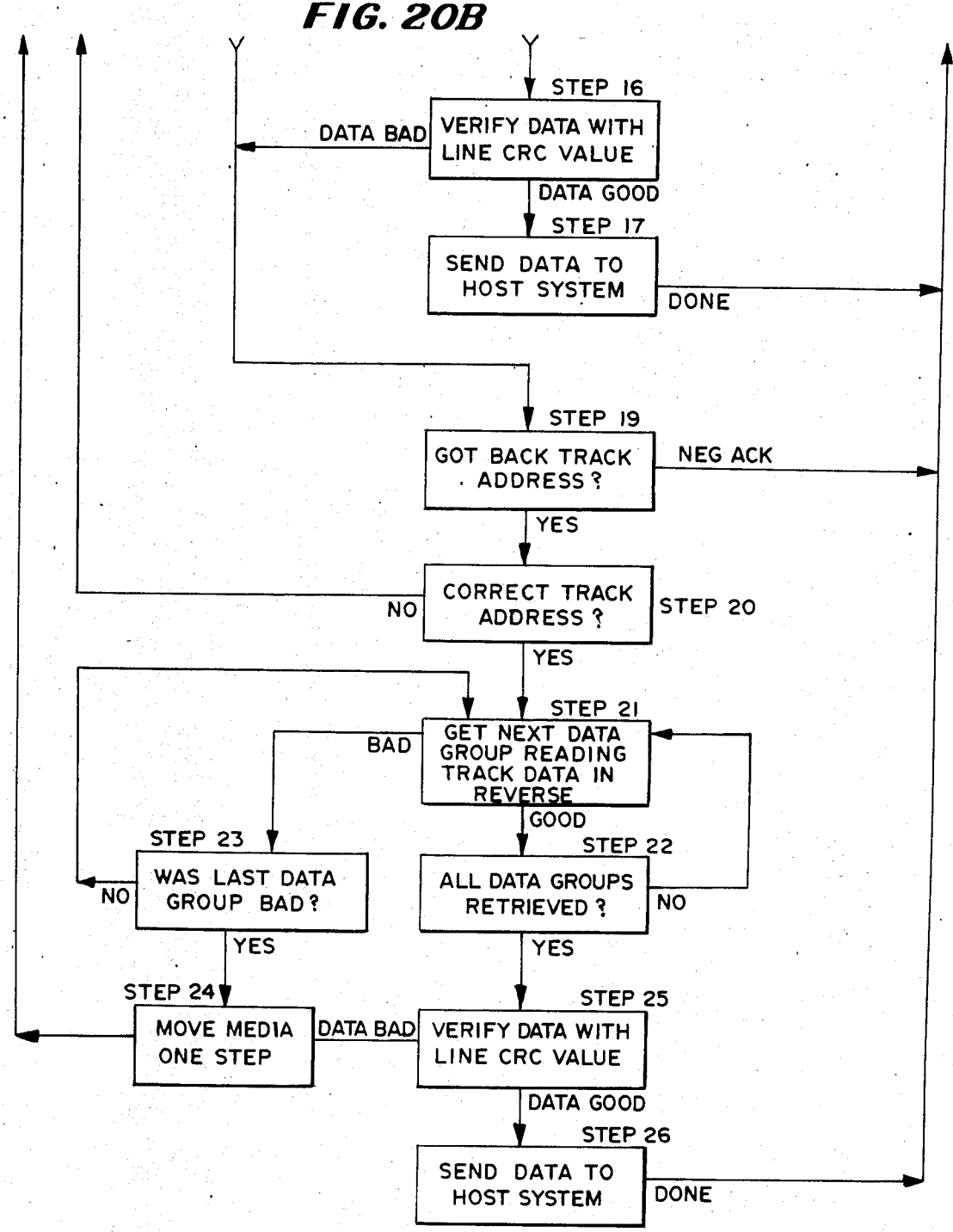

In FIGS. 20A and 20B, there is set forth a flow chart of the major steps performed by a computer program that has been designed for operating the apparatus 600 to achieve effective reading and verification of reading of data from a data record carrier or media 100. These steps are shown in FIGS. 20A and 20B in flow chart form and are described in greater detail below.

STEP 1. Here the memory is cleared and a number of operating parameters or variables are set by the program. These variables and parameters must be set for proper operation of the apparatus 600. In other words there are flags and values associated with different functions of the apparatus 600 and in the program for operating same which have to be initialized. For example, the carrier 612 has to be initialized to its home or zero position and the program must confirm that the carrier 114 is at the home position. Also, timers for the various stepping motors such as the carriage motor 642, skew adjust motor 658 and the carriage adjust motor 636 have to be zeroed and initialized. Further, a power up signal has to be sent to the power supplies of the apparatus 600. In all, there are several hundred variables or parameters which have to be initialized in step 1.

STEP 2. The computer waits for a valid command from an operator of the apparatus to be received from the RS 232 connector 672. In other words a host computer such as IBM PC or a Commodore 64 will send a command to the scanning and reading apparatus 600 to, for example, read a track. The command also could be to eject the media 100 from the apparatus 600 as in step 3 or to provide for skew adjust and radius adjust at step 4.

STEP 3. In this subroutine, the carrier 612 is moved to its home position and the plate 614 is raised so that the media 100 can be removed.

STEP 4. Here the skew adjust, or radius adjust subroutines are performed in the manner described above.

STEP 5. In step 5 the media is scanned to see if there is a proper number of tracks 114 on the media 100. If there is an illegal or improper number, the program follows the error exit. If there is a legal number of tracks on the media 100 then the program goes on to step 6.

STEP 6. At step 6 the program tells the computer to operate the apparatus 600 to find a particular track such as track 2 or track 0.

STEP 7. Next, once the track is found the apparatus 600 is told to wait until the magnet 682 on a turntable passes the sensor 681 on the sensor board 680 which indicates that an edge of the media 100 is about to be traversed by the light beam.

STEP 8. Here, a high resolution picture of the data in a data row 114 is supplied to the computer memory.

STEP 9. Here the computer memory determines whether or not a front track address is obtained.

STEP 10. If such a track address had not been obtained, the computer then determines if a back track address has been read.

STEP 11. If not, the carrier motor is operated to adjust the carrier 114 position to adjust the position of the media 100 and we go back to step 7.

STEP 12. If a front track address or back track address has been read, the computer determines whether this is the desired correct track address.

STEP 13. If the correct track address had not been determined, then the computer calculates the offset necessary to move the media to obtain the desired track. In other words, how many steps at 0.001 inch per step does the carriage motor 642 have to be operated to move the media 100 forward or backward to the position of the correct track. Then after the media 100 has been moved to the position of the desired track, steps 7–12 are repeated.

STEP 14. Now that it has been verified that the correct track has been found the first data group of a plurality of data groups is examined by the computer to see if it is a good set of data. As explained in copending application Ser. No. 445,241 there is typically from 3 to 21 coded groups in each track. If the data group is good, the program goes on to step 15.

STEP 15. Here it is determined whether or not all the data groups have been retrieved from the track of data that has been stored in the computer memory. Thus, for example, if there are 21 groups at step 15 the computer checks to see if all 21 groups have been obtained. If no, the program goes back to step 14 to get the next data group and determine whether it is good or bad.

STEP 16. At step 16, a cyclic redundancy checksum value is determined for that track and verified with the cyclic redundancy checksum, or CRC value, that that track should have. If the CRC value indicates that the data is bad, the program goes back to step 13.

STEP 17. If the CRC value indicates that the data is good, at step 17 the data is sent to the host computer which indicates that all the data in the track has been recovered.

STEP 18. At step 18 if the last data group was good but the present data group is bad, that data still can be recovered because of the coding of data on the media 100 as described in greater detail in co-pending application Ser. No. 445,241. Thus, even with one bad data group the program can go from step 18 back to step 14 and continue to retrieve the other groups. Then with all the data obtained from all the groups, the data in the missing group can be reconstructed as described in co-pending application Ser. No. 445,241. On the other hand, if at least two bad groups in a row are sensed at step 18, then the program goes on to step 19. Likewise, if the CRC value cannot be verified at step 16, the program goes down to step 19.

STEP 19. At step 19 the computer determines whether or not a back track address has been retrieved or read from the track 114. If no, it sends a signal back to the host system which is a negative acknowledged signal telling the host computer that the data in that track cannot be retrieved.

STEP 20. If the back track address had been obtained at step 20 the program determines whether it is the correct track address. If not, the program goes back to step 13 to find the right track.

STEP 21. If the address verified is the correct address, at step 21 the data groups on the track are read in reverse order starting with the data group next to the back track address and going toward the front track address. Also, at step 21 it is determined whether or not it is good data.

STEP 22. If the data in the data group analyzed in step 21 is good, at step 22 the computer again determines whether or not all data groups have been retrieved. If not, it goes back to step 21.

STEP 23. Meanwhile, if the data in the data group examined at step 21 is bad at step 23 the computer determines whether or not the last data group was bad. If no, the computer program can recreate the missing group of data and goes back to step 21 to get the next data group and proceed to step 22.

STEP 24. If two groups of data were bad, the program goes on to step 24 where the carriage is caused to be incremented one step of the eight possible steps, or namely 0.001 inch and the track is scanned again. In this respect, after the media 100 has been stepped or moved one step, namely 0.001 inch, the program goes from step 24 back to step 7 and repeats the previous operations.

Since a plurality such as eight scans, of the data track can be made with the apparatus 600, if a back track address is not obtained at step 19 instead of outputting a negative acknowledge signal to the host computer the program could go from step 19 to step 24 to move the media one step until all the available steps, such as eight steps, have been completedbefore outputting a NAK.

STEP 25. In any event, after all the data groups have been retrieved the program goes from step 22 to step 25. Here the data is verified by verifying the CRC value picked up from the track with the CRC value that is supposed to be on the track. If it is bad, the program goes to step 24 again to have the carriage motor 642 move the carrier 612 one step.

STEP 26. If the data is good the program then goes to this step 26 to send all the data that is stored in the computer memory to the host computer system and the operation of the apparatus 600 for one track has been completed.

It will be appreciated that the above-described protocol set forth in the flow chart in FIGS. 20A and 20B is then repeated for all the tracks. Also, it will be understood that the particular manner in which the data is coded and decoded and checked and double checked is explained in co-pending application Ser. No. 445,241, the disclosure of which is incorporated herein by reference.

From the foregoing description, it will be apparent that the scanning and reading apparatus 600 of the present invention has a number of advantages some of which have been described above and others of which are inherent in the invention.

Also, it will be apparent that modifications can be made to the method and apparatus of the present invention without departing from the teachings of the invention. Accordingly, the scope of the invention is only to be limited as necessitated by the accompanying claims.

What is claimed is:

1. A method of reading data from a data record carrier on which data has been recorded in arcuately nested, equal radii data rows which are equally spaced apart along a common centerline that is coextensive with a radius for each data row, comprising the steps of: incrementally moving the data record carrier in steps transversely of the data rows; projecting a light beam onto the plane in which the data record carrier moves; rotating the light beam about an axis parallel to the axis of said light beam to rotate said light beam in an arcuate path across the data record carrier, the radius of the arcuate path being the same or approximately the same radius of each data row; detecting scattered light outside the cone of specular reflection from the light beam impinging on the data record carrier, or the lack of scattered light, as the light beam traverses each data row; and sensing, and correcting for, difference between the arcuate path of said light beam and the arcuate path of the data row being traversed by said light beam to ensure that said light beam traverses approximately the same arc as that of each data row.

2. The method of claim 1 wherein said difference is a skew of the common centerline of the data rows relative to the line of movement of the data record carrier toward or away from the axis of rotation of said light beam.

3. The method of claim 2 wherein each data row has a front address and a back address with the data row having a thickness in the transverse direction thereof which is greater than the incremental step of movement of the data record carrier when it is moved, and said step of sensing for skew between the common centerline of the data rows on the record carrier and a radius of the rotating light beam is accomplished by reading and scanning the data row along the top edge or bottom edge of the row and determining whether both a front address and a back address are picked up during one complete scanning and reading of the data row; and causing lateral movement of said data record carrier transversely of the common centerline of the data rows when a front row address or back row address is not sensed.

4. The method of claim 1 wherein said difference is a difference between the radius of the light beam arcuate and the radius of the data row being scanned and read.

5. The method of claim 4 wherein one data row has a front address, a back address and a center address with the data row having a thickness in the traverse direction thereof which is greater than the incremental step of movement of the data record carrier and the step of sensing for difference in radius is accomplished by reading on scanning a data row along the top edge or the bottom edge of the data row with the pickup of only the front address and back address during a scan and read of a data row along the top edge of the row indicating that the radius of the arcuate light beam path is smaller than the radius of the data row and the picking up of a center address only while scanning the top edge of the row indicating that the radius of the arcuate light beam path is greater than the radius of the data row, and the correcting of the radius difference being effected by increasing or decreasing the radius of the arcuate light beam path about the axis of rotation thereof.

6. The method of claim 1 wherein said step of incremental movement is approximately 0.001 inch.

7. The method of claim 1 wherein the thickness or width of each data row in the transverse direction thereof is approximately 0.008 inch.

8. The method of claim 1 where each data row has a front address, a back address, and a plurality of coded data groups in the row between the addresses and wherein said method of reading data includes determining that a front row address has been read, verifying that that is the correct address desired to be read, decoding and checking the first group of data to determine if the data is good, determining how many data groups have been read and determined good, determining when all the data groups have been checked to determine that at least all but one are read and good, and then verifying that all the data from the row has been retrieved and is good.

9. The method of claim 8 wherein each step of verifying that all the data from the row is retrieved and good is accomplished by making a cyclic redundancy checksum value with a checksum value recorded in the data row.

10. The method of claim 8 wherein, if the front track address was not picked up, determining if the back track address has been picked up, verifying that that is the correct back address and if so proceeding to decode and verify, whether each succeeding coded group, reading such groups from the back address toward the front address, is a good group, until all the groups have been read and all or all but one group have been verified as good and to verify that the data in the row has been read and verified as being good.

11. The method of claim 10 wherein each step of verifying that all the data from the row is retrieved and good is accomplished by making a cyclic redundancy checksum for the coded groups and verifying that checksum value with a check sum value recorded in the data row.

12. The method of claim 10 wherein, if a front address cannot be read and/or a back address cannot be read incrementally moving the data record carrier one step and taking another reading of the data row and repeating this procedure so long as the light beam can travel along a part of the data row and pick up data therefrom and determining after each step which data of the data picked up in that scan is good data.

13. The method of claim 1 wherein the data in each data row on the record carrier are stored in data cells in each data row, each data cell having a predetermined length in the direction of the data row and being a completely dark area, a completely light area or a partly dark area and a partly light area, a completely dark data cell and a completely light data cell being nontransition cells which are interpreted as a logic 0 or a logic 1 data bit, and a partly dark and a partly light data cell being a transition cell which is interpreted as a logic 1 or logic 0 data bit, and the data being detected and picked up from each data row by determining the occurrrnce or nonoccurrence of a transition over the length of a data cell as the light beam travels along the data row and the occurrence of a transition between data cell lengths indicating a new data bit.

14. An apparatus for reading data from a data record carrier on which data has been recorded in arcuately nested, equal radii data rows which are equally spaced apart along a common centerline that is coextensive with a radius for each data row, comprising: means for incrementally moving the data record carrier in steps transversely of the data rows; means for projecting a light beam onto the plane in which the data record carrier moves; means for rotating said light beam about an axis parallel to the axis of said light beam to rotate said light beam in an arcuate path across the data record carrier, the radius of the arcuate path being the same or approximately the same radius of each data row; means for detecting scattered light outside the cone of specular reflection from the light beam impinging on the data record carrier, or the lack of scattered light, as the light beam traverses each data row; means for sensing difference between the arcuate path of said light beam and the arcuate path of the data row being traversed by said light beam, and means for correcting the difference to ensure that said light beam traverses approximately the same arc as that of each data row.

15. The apparatus of claim 14 wherein said difference is a skew of the common centerline of the data rows relative to the line of movement of the data record carrier toward or away from the axis of rotation of said light beam and said correcting means adjust the direction of movement of the data carrier to be more in line with a radius of said light beam arcuate path.

16. The apparatus of claim 15 wherein each data row has a front address and a back address with the data row having a thickness in the transverse direction thereof which is greater than the incremental step of movement of the data record carrier when it is moved, and wherein said means for sensing skew between the common centerline of the data rows on the record carrier and a radius of the light beam arcuate path is accomplished by reading and scanning the data row along the top edge or bottom edge of the row and determining whether both a front address and a back address are picked up during one complete scanning and reading of the data row; and said correcting means including means for causing lateral movement of said data record carrier transversely of the common centerline of the data rows when a front row address or back row address is not sensed.

17. The apparatus of claim 14 wherein said difference is a difference between the radius of the arcuate beam path and the radius of the data row being scanned and read and said correcting means include means for adjusting the radius of the arcuate light beam path.

18. The apparatus of claim 17 wherein one data row has a front address, a back address and a center address with the data row having a thickness in the transverse direction thereof which is greater than the incremental step of movement of the data record carrier and said means for sensing for difference in radius include means for reading on scanning a data row along the top edge or the bottom edge of the data row with the pickup of only the front address and back address during a scan and read of a data row along the top edge of the row indicating that the radius of the arcuate light beam path is smaller than the radius of the data row and the picking up of a center address only while scanning the top edge of the row indicating that the radius of the arcuate light beam path is greater than the radius of the data row, and said radius adjusting means being capable of increasing or decreasing the radius of the arcuate light beam path about the axis of rotation thereof.

19. The apparatus of claim 14 wherein said moving means include a carrier mounted for linear movement on a base and drive means for moving said carrier along a linear path, and said means for rotating said light beam comprises a turntable mounted for rotation on said base, said linear path being in a direction toward and away from the axis of rotation of said turntable, said light beam being directed downwardly from said rotating turntable onto said carrier carrying said data record carrier, and said detecting means being mounted on said turntable adjacent to the point where said light beam is directed downwardly from said turntable.

20. The apparatus of claim 19 wherein said difference correcting means includes means for moving said carrier laterally of said linear path of movement of said carrier for correcting for skew between the arcuate path of a data row and said light beam arcuate path.

21. The apparatus of claim 19 wherein said difference is a difference between the radius of the data row being read and the radius of the arcuate light beam path and said correcting means being mounted on said turntable and including movable support means movably mounted on said turntable for supporting said light beam directing means and means for moving said support means to change the radius between the axis of rotation of said turntable and the axis of said light beam.

22. The apparatus of claim 19 including transmission means mounted on said turntable and coupled to said detector for transmitting data optically detected by said detector from said turntable and computing means coupled to said transmission means for receiving, storing and deciphering the data detected by said detector.

23. The apparatus of claim 22 wherein said transmission means includes means in said detector for transducing the optical data detected to electrical signals, means for amplifying said electrical signals, means for transducing said electrical signals to optical signs, means for directing said optical signals along the axis of rotation of said turntable, means on the axis of rotation of said turntable for detecting and transducing said axially transmitted optical signals to electrical signals and for supplying said electrical signals to said computing means.

24. The apparatus of claim 23 including transformer means for supplying power to said transmission means on said terminal, said transformer means comprising a stationary primary winding fixedly mounted around the axis of rotation of said turntable, and a secondary winding fixed to said turntable about said axis of rotation of said turntable and adjacent to said primary winding, said transmission means being coupled to said secondary winding, and said primary winding being coupled to a source providing alternating current at a frequency substantially higher than the frequency of rotation of said turntable.

25. The apparatus of claim 19 including a light source mounted on said turntable for supplying said light beam which is directed downwardly from said turntable and transformer means for supplying power to said light source, said transformer means comprising a primary winding which is fixed against rotation about the axis of rotation of said turntable and a secondary winding fixed to said turntable about the axis of rotation of said turntable and adjacent to said primary winding, said secondary winding being coupled to said light source and said primary winding being coupled to an alternating current source providing alternating current at a frequency significantly higher than the frequency of rotation of said turntable.

26. The apparatus of claim 14 wherein said means for rotating said turntable include a motor fixedly mounted in said apparatus and having an output shaft, a wheel mounted on said output shaft in a plane coplaner with said turntable and a belt extending about said turntable and about said wheel of said motor whereby rotation of said wheel will drive said belt to drive said turntable.

27. The apparatus of claim 26 wherein said turntable has a concave groove in the periphery thereof for receiving said belt.

28. The apparatus of claim 26 including a computer for controlling operation of said apparatus and in particular operation of said turntable drive motor and operation of said carrier drive means, said apparatus having means for sensing the position of said turntable coupled to said computer, and said computer being operable to control the speed of said turntable drive motor to adjust the speed of rotation of said turntable.

29. The apparatus claim 14 including a computer and means for sensing when said carrier is at its outermost position relative to the axis of rotation of said turntable, said sensing means being coupled to said computer.

* * * * *